(12) United States Patent
Li et al.

(10) Patent No.: US 11,611,840 B2
(45) Date of Patent: *Mar. 21, 2023

(54) THREE-DIMENSIONAL AUDIO SYSTEMS

(71) Applicant: Li Creative Technologies, Inc., Florham Park, NJ (US)

(72) Inventors: Qi Li, New Providence, NJ (US); Yin Ding, Livingston, NJ (US); Jorel Olan, Plano, TX (US); Jason Thai, Pearland, TX (US)

(73) Assignee: Li Creative Technologies, Inc., Florham Park, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/568,343

(22) Filed: Jan. 4, 2022

(65) Prior Publication Data

US 2022/0210595 A1 Jun. 30, 2022

Related U.S. Application Data

(63) Continuation of application No. 17/227,067, filed on Apr. 9, 2021, now Pat. No. 11,240,621.

(60) Provisional application No. 63/036,797, filed on Jun. 9, 2020, provisional application No. 63/008,723, filed on Apr. 11, 2020.

(51) Int. Cl.
*H04S 7/00* (2006.01)

(52) U.S. Cl.
CPC .......... *H04S 7/302* (2013.01); *H04S 2420/01* (2013.01)

(58) Field of Classification Search
CPC .............. H04R 5/033; H04R 2201/107; H04S 2420/01; H04S 2400/11

USPC .......................... 381/310, 301, 309, 300, 74
See application file for complete search history.

(56) References Cited

U.S. PATENT DOCUMENTS

| 8,359,195 | B2 | 1/2013 | Li |
| 8,861,756 | B2 | 10/2014 | Li et al. |
| 9,131,305 | B2 | 9/2015 | Li et al. |
| RE47,049 | E | 9/2018 | Li et al. |

(Continued)

OTHER PUBLICATIONS

Li et al., "A Portable USB-based Microphone Array Device for Robust Speech Recognition", IEEE International Conference on Acoustics, Speech, and Signal Processing, Taipei, Apr. 2009, pp. 1-4.

(Continued)

*Primary Examiner* — Alexander Krzystan
(74) *Attorney, Agent, or Firm* — Zhong Law, LLC

(57) ABSTRACT

A sound generation system and related method include a user interface device and a processing device to obtain a specification of a three-dimensional space, obtain one or more sound tracks each comprising a corresponding sound signal associated with a corresponding sound source, present, in a user interface, representations representing one or more listeners and the one or more sound sources corresponding to the one or more sound signals in the three-dimensional space, responsive to a configuration of the locations of the one or more listeners or the locations of the one or more sound sources in the three-dimensional space in the user interface, determine filters based on the configuration and pre-determined locations of one or more loudspeakers, and apply the filters to the one or more sound signals to generate filtered sound signals for driving the one or more loudspeakers.

20 Claims, 19 Drawing Sheets

(56) References Cited

U.S. PATENT DOCUMENTS

| | | | |
|---|---|---|---|
| 10,261,749 B1* | 4/2019 | Wilcox | G06F 3/04845 |
| 10,687,145 B1* | 6/2020 | Campbell | H04H 60/58 |
| 10,721,521 B1* | 7/2020 | Robinson | G06F 3/011 |
| 2007/0126616 A1* | 6/2007 | Cho | H03M 1/0673 |
| | | | 341/144 |
| 2017/0034641 A1 | 2/2017 | Meshram | |
| 2018/0091921 A1 | 3/2018 | Silva | |
| 2018/0359294 A1 | 12/2018 | Brown et al. | |
| 2019/0349702 A1 | 11/2019 | Miller et al. | |
| 2020/0368616 A1* | 11/2020 | Delamont | A63F 13/213 |

OTHER PUBLICATIONS

Cano et al., "Musical Source Separation: An Introduction," IEEE Signal Processing Magazine, vol. 36, Issue: 1, Jan. 2019, pp. 1-10.
Li et al., "Show & Tell Demostration," Configurable 3D Audio and Music, IEEE ICASSP 2012.

* cited by examiner

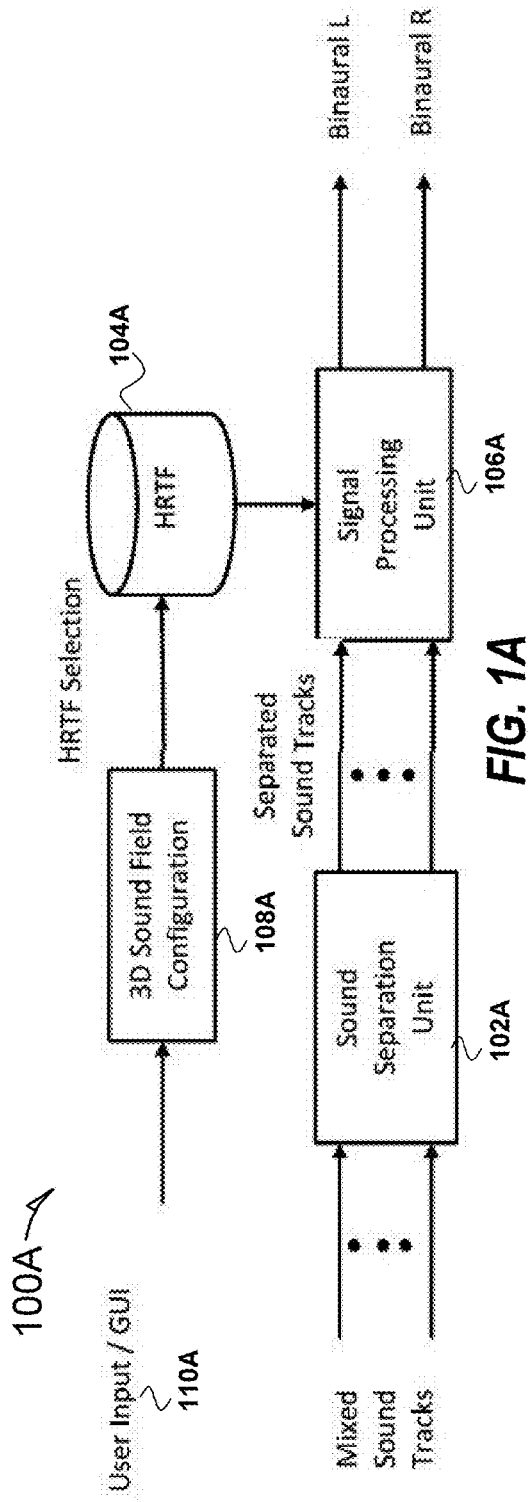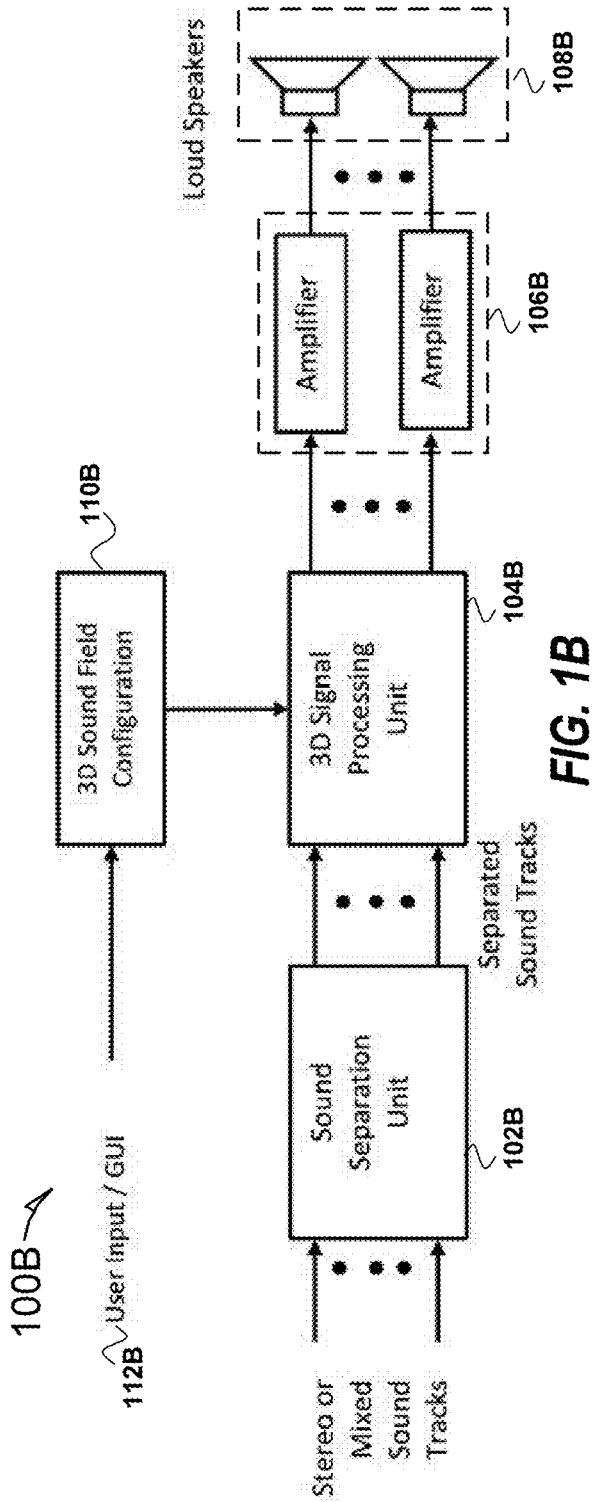

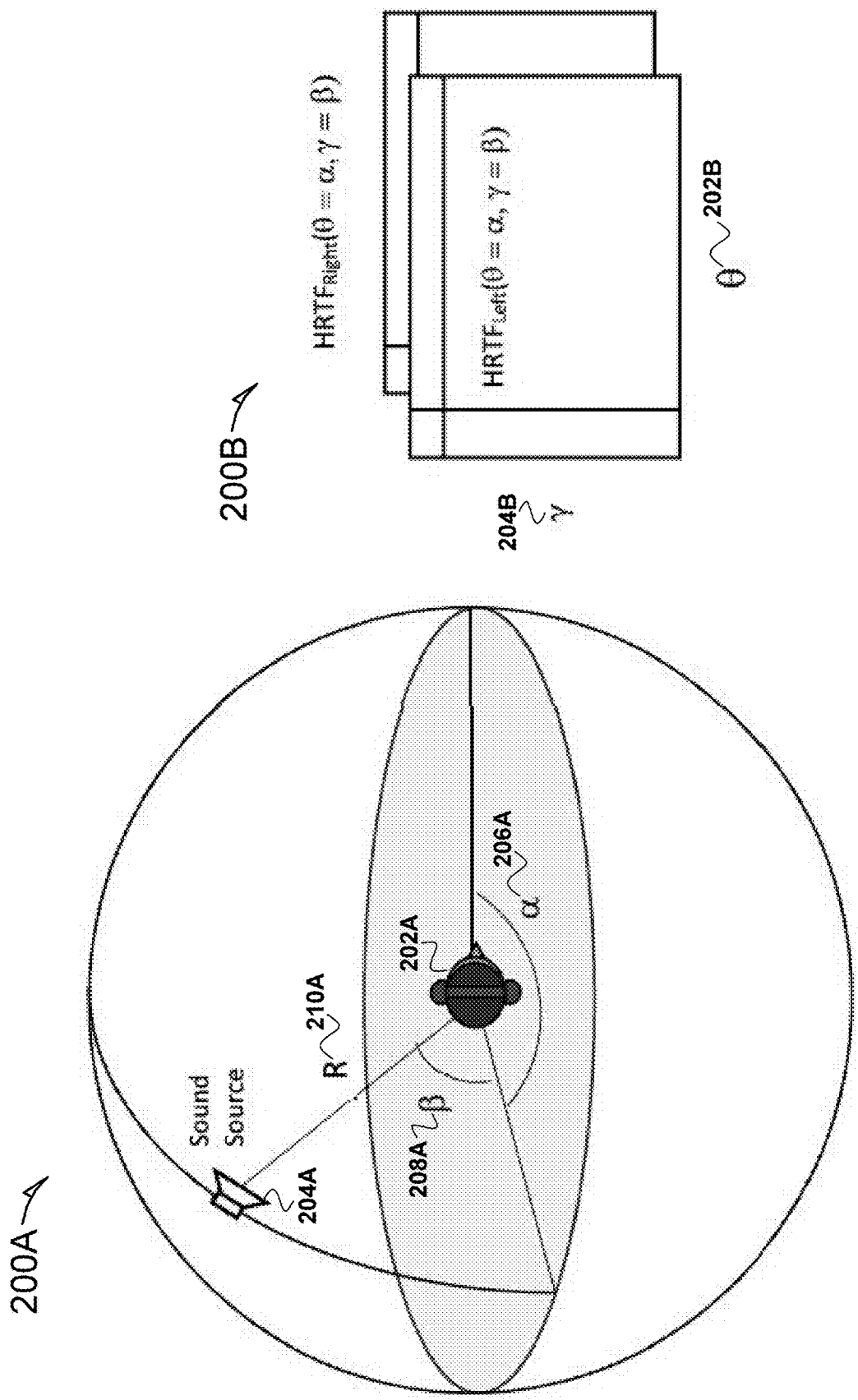
FIG. 2A Sound source and listener relation
FIG. 2B HRTF data structure and retrieval

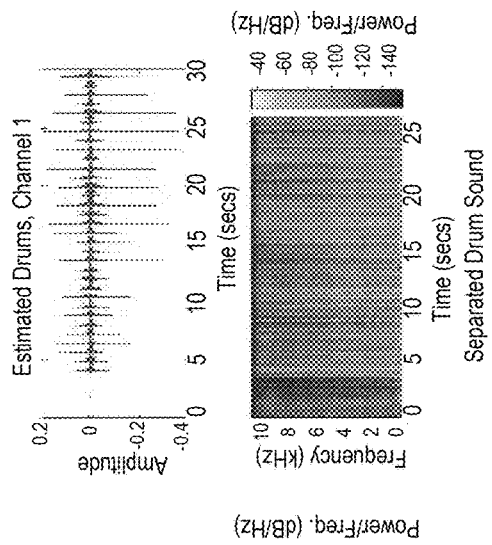
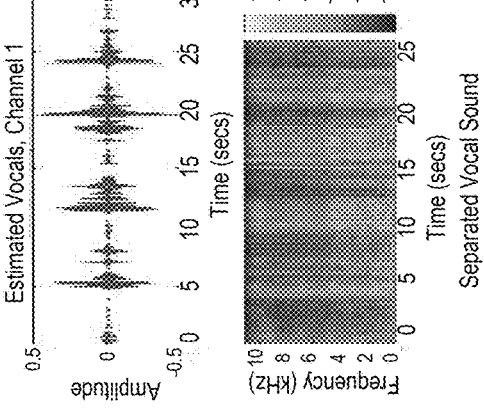
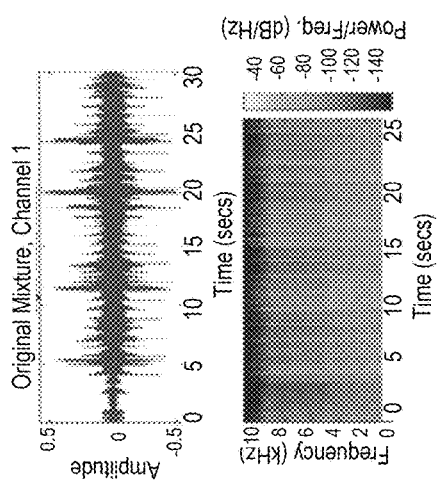
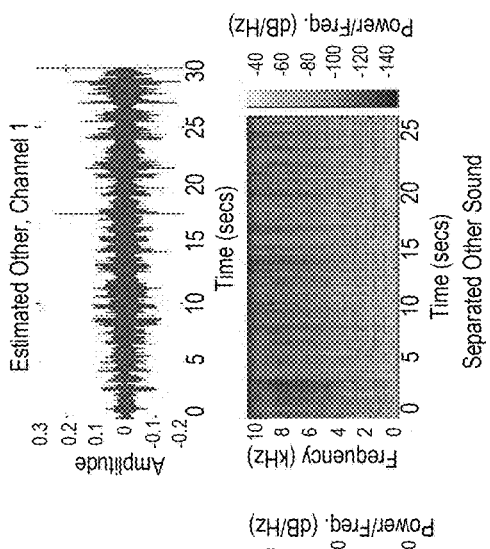
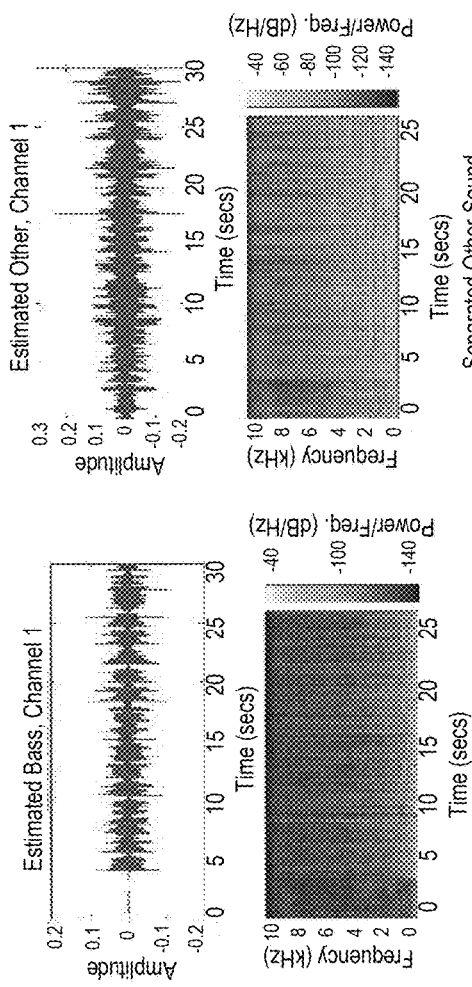
FIG. 5A
FIG. 5B
FIG. 5C
FIG. 5D
FIG. 5E

THREE-DIMENSIONAL AUDIO SYSTEMS

CROSS-REFERENCE TO RELATED APPLICATIONS

This application is a continuation of U.S. application Ser. No. 17/227,067 filed on Apr. 9, 2021 which claims the benefit of the following patent applications: U.S. provisional application Ser. No. 63/008,723, filed on Apr. 11, 2020; and U.S. provisional application Ser. No. 63/036,797, filed on Jun. 9, 2020. The contents of the above-mentioned applications are hereby incorporated by reference in their entirety.

TECHNICAL FIELD

The present disclosure relates to the generation of three-dimensional sound, and in particular to systems and methods for capturing and processing mixed sound tracks into separate sound types and then applying transfer functions to the separated sound to generate three-dimensional sound that contains spatial information about the sounds sources to recreate a three-dimensional (3D) sound field that has been configured by users.

BACKGROUND

Billions of people listen to music worldwide, but most listeners may only have access to music in a mono or stereo sound format. Stereo is a method of sound reproduction that may use multiple independent audio channels played using two or more speakers (or headphones) so that the sound from the speakers appears to be coming from various directions, as in natural hearing. However, stereo sound usually refers to just two audio channels to be played using two speakers or headphones. More immersive sound technologies like surround sound need to record and save multiple sound tracks (e.g., 5.1 or 7.1 surround sound configurations), and the sound must be played through an equivalent number of speakers. In any case, each of the audio channels or sound tracks consists of mixed sound from multiple sound sources. Therefore, stereo sound is different from "real" sound (e.g., a listener in front of a stage at a concert) because spatial information regarding the individual sound sources (e.g., instruments and vocals) is not reflected in the sound.

With two ears, a person may perceive spatial information and hear "real" three-dimensional (3D) sound as binaural sound (e.g., sound represented by a left ear and a right ear), such as how music is perceived by two ears in a music hall, theater or at a sporting event at a stadium or arena. However, as noted above, today's music technology usually provides only mono or stereo sound without spatial cues or spatial information. For this reason, music and other sounds may be experienced differently and often more enjoyably in theaters, arenas, and music halls than it is through headphones or earbuds or on loudspeakers or even on multiple-channel, multiple-loudspeaker surround systems. Currently, the generation of 3D sound may be accomplished, for example, by many loudspeakers mounted on the walls of a movie theater with each loudspeaker being driven by a separate sound track recorded during manufacturing of a movie. However, this kind of 3D audio system may be very expensive and cannot be realized in mobile devices as an app (application software) or even in most home theater or in-car configurations. Therefore, in today's music and entertainment industry, most of music or other audio data is stored and played as mono or stereo sound, where all sound sources, such as vocals and different kinds of instruments, are pre-mixed into just one (mono) or two (stereo) sound tracks.

Most audio/sound from a video conferencing device, such as a computer, laptop, smartphone, or tablet, is in mono sound. Although on a display screen, a user (e.g., an attendee or participant), may see all attendees of the conference in separate windows, the audio is usually only one channel mono with a narrow bandwidth. Using video of each of the different attendees, a virtual conference room may be accomplished, but the audio component cannot match the video component because it does not have the 3D sound which is necessary for providing a more accurate (e.g., spatially) virtual reality sound experience. Furthermore, when two attendees have similar sounding voices, the user may not be able to distinguish between voices when they are talking at the same time or even separately. This may happen, for example, when the user is watching shared documents on another screen or video window while the user is not looking at the attendees' faces. The problem may be even worse when more attendees are in a video conference, such as a remote learning classroom. The user may need spatial information, like 3D sound, to help identify which attendee is speaking based on the conference sound alone.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIGS. 1A-1B illustrate systems for generating three-dimensional sound, according to implementations of the present disclosure.

FIGS. 2A-2B illustrate a spatial relationship between a sound source and a listener in a three-dimensional space and a selection of filters for generating 3D sound that reflects the spatial relationship, according to implementations of the present disclosure.

FIGS. 5A-5E illustrate original mixed sound in waveform and spectrogram and the mixed sound separated into vocal, drum, base, and other sound, respectively, according to implementations of the present disclosure.

DETAILED DESCRIPTION

Figure 3:
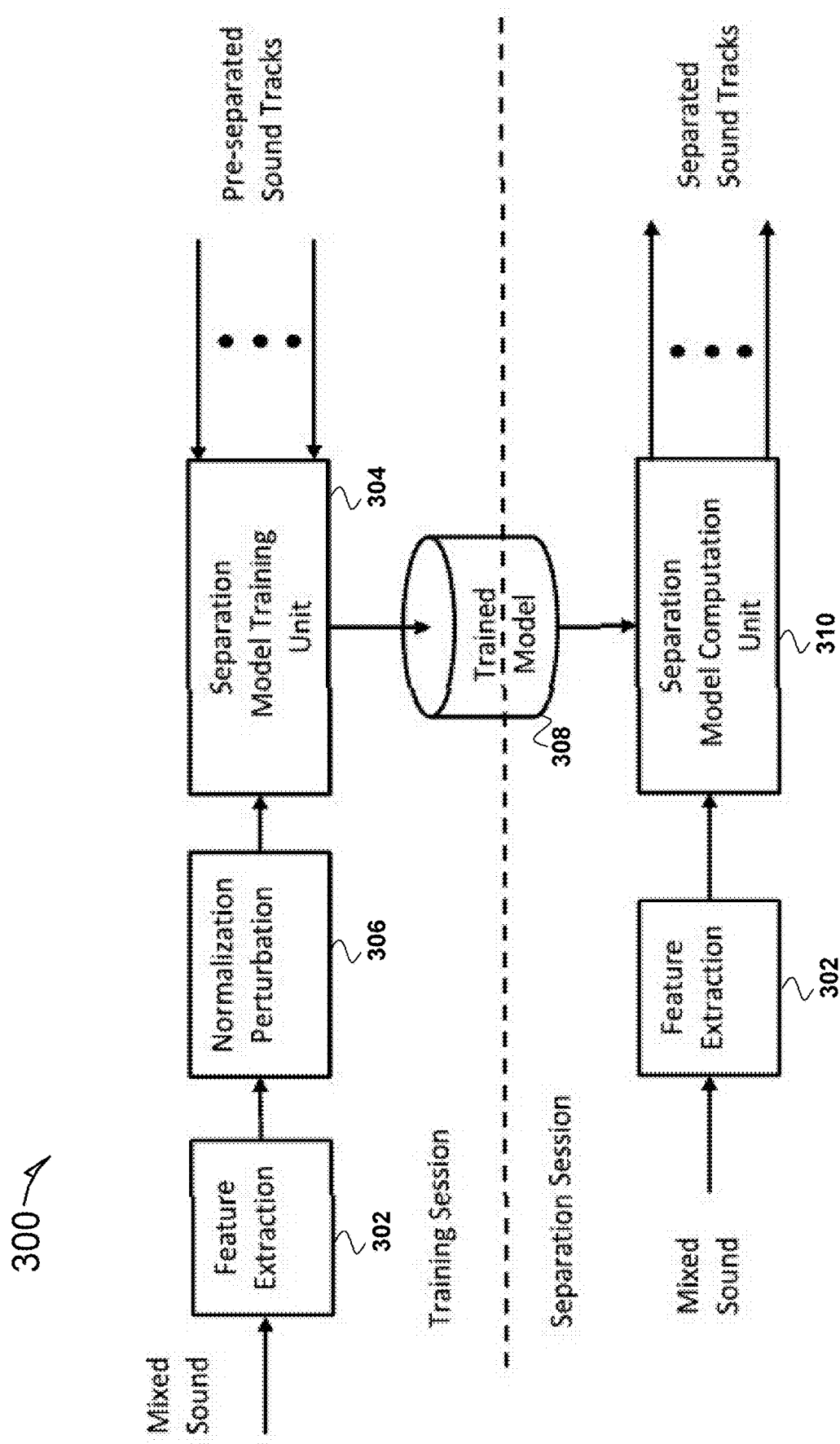
FIG. 3 illustrates a system for training a machine learning model to separate mixed sound tracks, according to an implementation of the present disclosure.

Described herein are three-dimensional (3D) configurable soundstage audio systems and applications and implementations. A three-dimensional (3D) sound field refers to sound that includes discrete sound sources located at different spatial locations. The 3D soundstage is the sound representing the 3D sound field. For example, soundstage music may allow a listener to have an auditory perception of the isolated locations of instruments and vocal sources when listening to a given piece of music either through earphones, headphones, or loudspeakers. In general, the 3D soundstage may have embedded cues for the listener's perception of the spatial information. The soundstage may also be configurable so that it may be configured by the listener, a DJ, software, or audio systems. For example, the location of each instrument in the 3D sound field may be moved while the listener's location in the 3D sound field may be dynamic or static at the location of a preferred instrument.

In order to listen to or to play the 3D soundstage a listener may use binaural sound represented by two tracks, one for the left ear and one for the right ear, with embedded cues for listener perception of spatial information associated with sound sources. Binaural sound may be experienced as 3D sound (e.g., as if coming from different locations) through earphones, headsets or other such devices. Alternatively, direct 3D sound may be used to play the 3D soundstage. In direct 3D sound, the sound is played from a group of loudspeakers located in different 3D locations (e.g., corresponding to desired locations for individual sound sources in the 3D sound field). Each loudspeaker may play one isolated sound track, e.g., one speaker for drum and another for bass. The listener may hear the 3D sound field from the loudspeakers directly since they are at different locations in a real world 3D sound field. In both the binaural and direct 3D sound use cases, the listener's brain may perceive the 3D sound field and may recognize and track the discrete sound sources like in the real world, which may be referred to as acoustic virtual reality throughout the present disclosure.

Furthermore, another way to achieve the 3D sound field may be to record binaural sound directly with a specialized binaural/3D microphone. Most existing binaural microphones are just a dummy human head with microphones installed in the ears which may be too big in the size and/or too expensive for many applications. Accordingly, described herein is a 3D microphone that may be have a small form factor by using an array of very small microphones and signal processing technology. This small form 3D microphone may be used with any handheld recording device such as a smartphone or tablet. The output of the sound captured by the 3D microphone may be presented as binaural, stereo, or multi-track recordings, with one track for each spatial direction associated with a sound source for the 3D sound field.

Also, in the present disclosure, three techniques are described to enhance the signal-to-noise ratio (SNR) of audio signals as follows. Noise reduction is the process of reducing the background noise in an audio channel based on temporal information, such as the statistical properties between signal and noise or the frequency distributions of different kinds of signals. A microphone array uses one or multiple acoustic beam patterns to enhance the sound coming from one beam direction while canceling the sound coming from outside the beam direction. An acoustic echo canceller (AEC) uses one or more reference signals to cancel the corresponding signals mixed in the microphone captured signals. The reference signal(s) is/are correlated to the signal(s) which the AEC will cancel.

Systems

FIGS. 1A-1B illustrate systems 100A and 100B for generating three-dimensional sound, according to implementations of the present disclosure. Systems 100A and 100B may be standalone computer systems or a networked computing resources implemented in a computing cloud.

Referring to FIG. 1A, system 100A may include a sound separation unit 102A, a storage unit 104A for storing a plurality of filters such as head related transfer function (HRTF) filters, all-pass filters, or equalization filters, a signal processing unit 106A, and a 3D sound field configuration unit 108A with a graphical user interface (GUI) 110A for receiving user input. For the conciseness of discussion, the filters in the following are referred to as HRTF filters although it is understood that the filters can be any types of suitable filters including all-pass filters or equalizer filters. The sound separation unit 102A, the storage unit 104A and the 3D sound field configuration unit 108A may be communicatively coupled to the signal processing unit 106A. Signal processing unit 106A may be a programmable device that may be programmed to implement three-dimensional sound generation according to configurations received via the GUI 110A presented on a user interface device (not shown).

In the example of FIG. 1A, the input to sound separation unit 102A is original mixed sound tracks of mono or stereo signal or audio, while the output from signal processing unit 106A is 3D binaural audio for left and right ears, respectively. Each of the input of mixed tracks or channels may first be separated into a set of separated sound tracks (e.g., for one corresponding sound source that may be associated with one or more sound types) by the sound separation unit 102A, where each track represents one type (or category) of sound, for example, vocal, drums, bass, or others (e.g., based on the nature of the corresponding sound source).

Each of the separated sound tracks may then be processed by signal processing unit 106A using a pair HRTF filters from storage unit 104A to output two audio channels representing left and right ear channels, respectively, for each separated sound track. In one implementation, the above-noted process may be performed in parallel for each of the input mixed sound tracks.

Figures 7A, 7B, 7C, 7D:
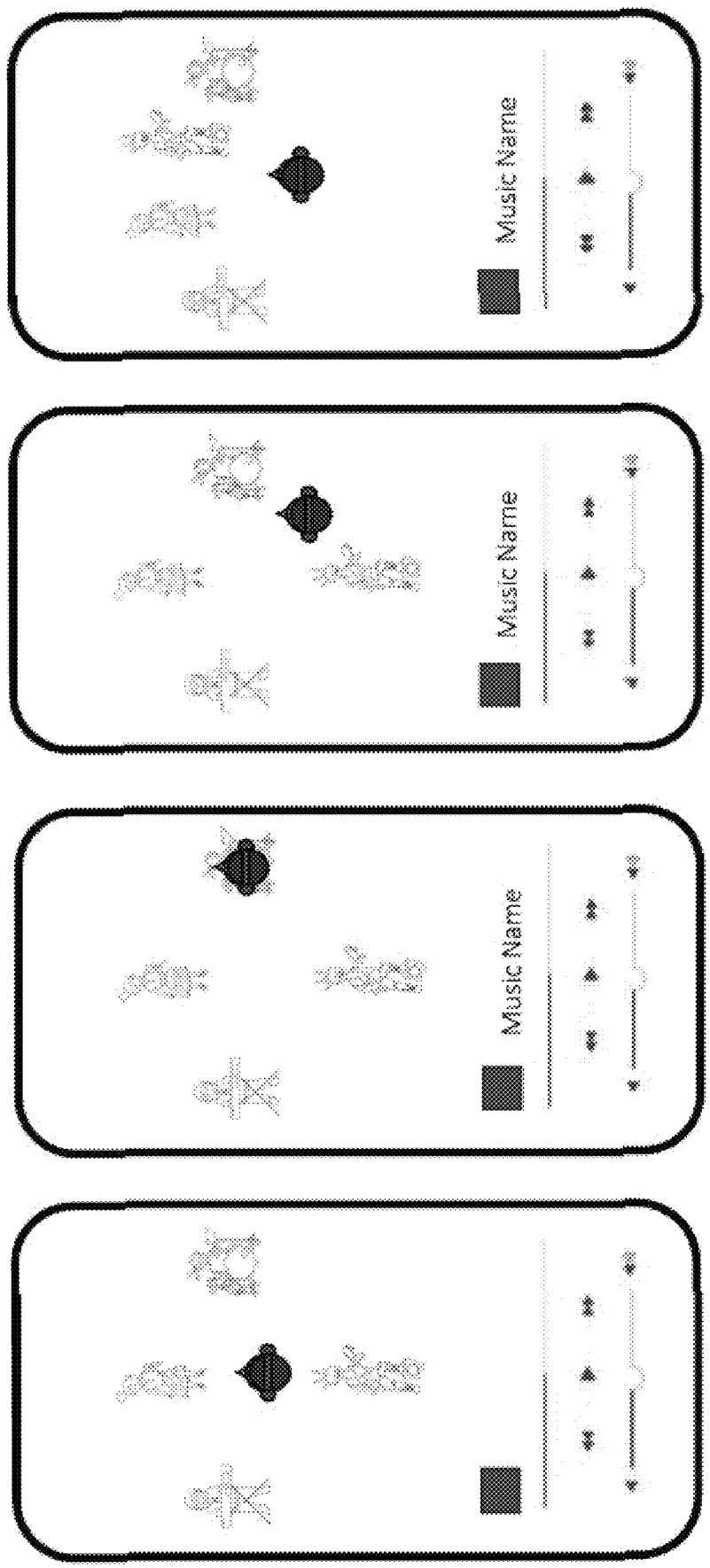
FIGS. 7A-7D illustrate a GUI for user configuration of 3D sound with selected listener positions inside a band formation (7A-7C) and in the front of the band formation (7D), respectively, according to implementations of the present disclosure.

Each HRTF filter (e.g., a pair of left and right HRTF filters 200B of FIG. 2B described below) may be associated with a point on the grid in the three-dimensional space (e.g., the HRTF filters may be stored as a mesh of grid points in a database) and each of the grid points may be represented by two parameters: azimuth angle $\theta$ and attitude angle $\gamma$ (e.g., 202B and 204B of FIG. 2B respectively). The mesh of HRTF filters (e.g., 200B) may be an array of pre-computed or pre-measured pairs of left and right HRTF filters defined on the grid in the three-dimensional space (e.g., 200A), where each point of the grid is associated with one pair of left and right HRTF filters. Pairs of HRTF filters may be retrieved by applying an activation function, where the inputs to the activation function. may include the relative positions and distance/range between the sound source and the listener, and the outputs of the activation function can be the determined HRTF database indexes to retrieve pairs of HRTF filters defined on grid points. For example, in one implementation of the activation function, the inputs to the activation function can be azimuth angle $\theta$ and attitude angle $\gamma$, while the outputs are the database index to retrieve a pair of left and right HRTF filters. The retrieved HRTF filters can then be used to filter the separated sound tracks. For each separated sound track, an activation function needs to be called to retrieve the corresponding pair of HRTF filters. The values of azimuth angle $\theta$ and attitude angle $\gamma$ can be determined from the user configuration specifications. For example, as shown in FIG. 7A, the azimuth angle $\theta$ has the values of 0° (vocal), 30° (drum), 180° (bass), and 330° (keyboard) and the attitude angle $\gamma$ is 0, then four pairs of the HRTF filters need to be retrieved by the activation function to filter four separated sound tracks, respectively.

As noted below with respect to FIG. 2A and FIG. 2B, the listener (e.g., 202A) and/or the sound source (e.g., 204A) may be moving with angles $\theta$ and $\gamma$ changing over time. A sequence of new pair of HRTF filters (e.g., 200B) may then need to be retrieved dynamically in order to output the correct binaural sound to virtually represent the sound received by the listener (e.g., 202A) in the 3D sound space (e.g., 200A). The dynamic retrieval of the HRTF filters may be facilitated by the storage of the filters as a mesh because a pair of stored HRTF filters may already be associated with any point on the grid in the 3D space where the listener and/or sound source(s) may be located during movement. The range R (210A) can be represented by the volume of the filtered sound. Thus, the closer between the listener to sound source, the louder the sound volume.

All of the output left audio tracks may then be mixed to generate the left channel of the binaural sound (e.g., Binaural L), while all the right channels may be mixed to generate the right channel of the binaural sound (e.g., Binaural R). When both the L and R channels are played through earphones or a headset, a listener may experience 3D binaural sound and perceive the spatial locations of the sound sources in the 3D sound field.

Furthermore, the listener may configure the locations and/or volume of each sound source and/or of the listener in the 3D sound field through the GUI 110A. Virtually (e.g., in the acoustic virtual reality), the listener and the sound source(s) may be located in any location within the 3D sound field and the volume of each of the sound source(s) may be proportional to the distance from the location of the listener to the location of the sound source in the 3D sound field. For example, the sound source location and/or volume may be configured through the GUI 110A which may be presented via a user interface device. The user interface device may be, for example, in the form of a touch screen on a smartphone (FIG. 7A-7D) or tablet. In one implementation, the virtual location of the vocal sound source may be in front of the listener in the 3D sound field, the drum sound source may be to the front right of the listener, the bass sound source may be behind the other sound sources with respect to the listener (e.g. farther away), and "other" instrument (e.g., unidentified sound type or category) may be to the front left of the listener, with the drum and bass sound sources configured to be louder and the vocal and "other" sound sources configured to be quieter by locating the listener (virtual head) near the drum and bass (FIG. 7C). The listener may then hear the 3D sound field, according to the listener's own configuration, from the binaural output (e.g., Binaural L and Binaural R). The listener will hear a solo performance if placing the virtual head and the instrument in the same position (e.g., FIG. 7B).

In one implementation, to generate the binaural output (e.g., Binaural L+R) as shown in FIG. 1A, for each separated sound track associated with a corresponding sound source location, a pair of corresponding HRTF filters may be selected (e.g., from storage unit 104A) to process (e.g., by the signal processing unit 106A) the separated sound track into two outputs: L and R audio. Finally, a mixer (not shown) can mix all of the L and all of the R tracks respectively to output the binaural L, R signals. The selection of the corresponding HRTF filters will be discussed in more detail further below (e.g., see the description of FIG. 2 below). If the mixed sound tracks are stereo (two sound tracks), each one of the sound tracks needs to go through the above process to generated the mixed binaural sound. When both the L and R channels are played through earphones or a headset, a listener can experience 3D binaural sound and perceive the 3D sound field.

Referring to FIG. 1B, system 100B may include a sound separation unit 102B, a 3D signal processing unit 104B, amplifiers 106B, loudspeakers 108B, and a 3D sound field configuration unit 110B with a graphical user interface (GUI) 112B for receiving user input. The sound separation unit 102B and the 3D sound field configuration unit 110B may be communicatively coupled to the signal processing unit 104B. Signal processing unit 104B may be a programmable device that may be programmed to implement three-dimensional sound generation according to configurations received via the GUI 112B presented on a user interface device (not shown).

In the example of FIG. 1B, the input to sound separation unit 102B is original stereo or mixed sound tracks of mono or stereo signal or audio, while the output from 3D signal processing unit 104B is a set of sound tracks to drive multiple loudspeaker 108B through amplifiers 106B. Each of the input of mixed tracks or channels may first be separated into a set of separated sound tracks (e.g., for one corresponding sound source or type) by the sound separation unit 102B, where each track represents one type (or category) of sound, for example, vocal, drums, bass, or others (e.g., based on the nature of the corresponding sound source). Each of the separated sound tracks may then be processed by 3D signal processing unit 104B to output a single sound track to drive one loudspeaker 108B through one amplifier 106B, respectively, for each processed sound track. In one implementation, the above-noted process may be performed in parallel for each of the input mixed sound tracks. All of the output sound tracks may then be played through the loudspeakers 108B (e.g., at different locations in the real world) to form a real world 3D sound field for the listener's real world location.

As noted above with respect to FIG. 1A, the listener may configure the locations and/or volume of each sound source and/or of the listener in the 3D sound field through the GUI 112B. Virtually (e.g., in the acoustic virtual reality), the listener and the sound source(s) may be located in any location within the 3D sound field and the volume of each of the sound source(s) may be proportional to the distance from the location of the listener to the location of the sound source in the 3D sound field. For example, the sound source location and/or volume may be configured through the GUI 112B which may be presented via a user interface device. The user interface device may be, for example, in the form of a touch screen on a smartphone or tablet. The listener may then hear the 3D sound field, according to the listener's own configuration, from the output of loudspeakers 108B.

An implementation of GUI 110A or GUI 112B may be seen in FIGS. 7A-7D which are described in detail below.

FIGS. 2A-2B illustrate a spatial relationship between a sound source 204A and a listener 202A in a three-dimensional space 200A and a selection of HRTF filters 200B for generating 3D sound that reflects the spatial relationship, according to implementations of the present disclosure.

A head related transfer function (HRTF) filter (e.g., like those stored in storage unit 104A of FIG. 1A) may characterize how a human listener, with external human ears on a head, at a first specified location in a three-dimensional space receives a sound from a sound source at a second specified location in the same 3D space. As sound waves strike the listener, the size and shape of the head, ears, ear canal, density of the head, size and shape of nasal and oral cavities, all transform the sound and affect how it is perceived by the listener, boosting some frequencies and attenuating others. But the envelop of response spectrum may be more complex than a simple boost or attenuation: it may affect a broad frequency spectrum and/or it may vary significantly from different sound direction.

With two ears (e.g., binaural hearing), a listener may localize sounds in three dimensions: in range (distance); in direction above and below; and in front and to the rear, as well as to either side. This is possible because the brain, inner ear and the external ears (pinna) work together to make inferences about location. The listener may estimate the location of a sound source by taking cues derived from one ear (monaural cues), and by comparing cues received at both ears (difference cues or binaural cues). Among the difference cues are time differences of arrival at each ear and intensity differences at each ear. The monaural cues come from the interaction between the sound source and the listener's human anatomy, in which the original source sound is modified by the inner ear and the external ears (pinna) before it enters the ear canal for processing by the cochlea and the brain. These modifications encode the sound source location, and may be captured via a relationship between the sound source location and the listener's location. A sound track filter based on this relationship is referred to herein as the HRTF filter. Convolution of an sound track with a pair of HRTF filters converts the sound to generate binaural signals for left and right ears respectively, wherein the binaural sound signals (e.g., Binaural L+R of FIG. 1A) correspond to the real world 3D sound field signals that would be heard at the listener's location if the source sound were played at the location associated with the pair of HRTF filters.

Figure 4:
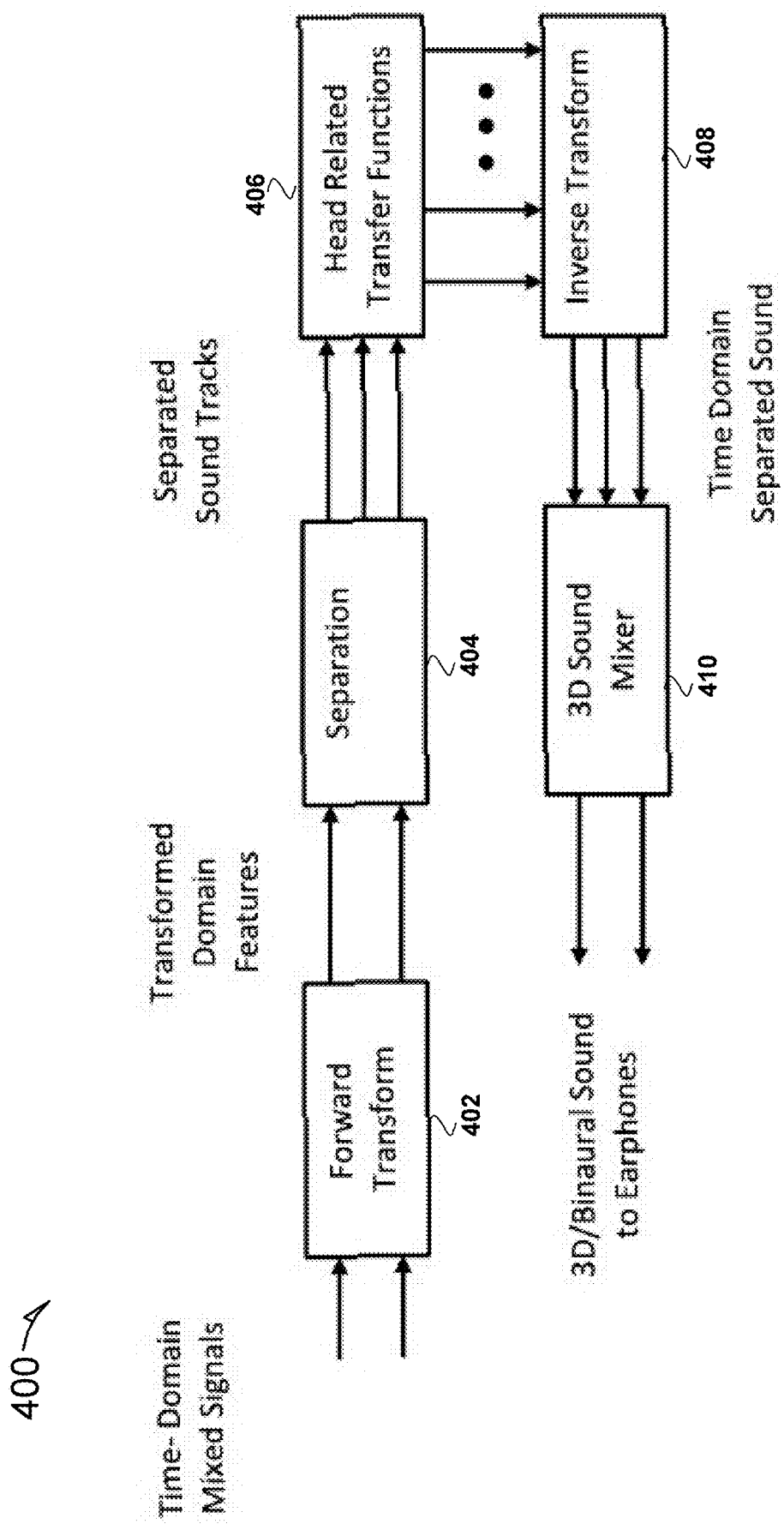
FIG. 4 illustrates a system for separating and filtering mixed sound tracks using transformed domain sound signals, according to an implementation of this disclosure.

A pair of binaural tracks for the left and right ears of the listener may be used to generate a binaural sound, from mono or stereo, which seems to come from a particular location in space. A HRTF filter is a transfer function, describing how a sound from a specific location in a 3D space will arrive at the listener's location (generally at the outer end of the listener's auditory canal). The HRTF filter may be implemented as convolutional computation in the time domain or multiplication in the frequency domain to save computation time as shown in FIG. 4 (described more fully below). Multiple pairs of HRTF filters may be applied to multiple sound tracks from multiple sound sources to generate the 3D sound field represented as the binaural sound signals. The corresponding HRTF filters may be selected based on the listener's configuration, i.e., the desired relative locations of sound sources to a listener.

Referring to FIG. 2A, the 3D sound space 200A where sound sources (e.g., 204A) and listener 202A are located may be represented as a grid with a polar coordinate system. The relative location and distance from the listener 202A to the sound source 204A may be determined according to three parameters: azimuth angle θ (202B of FIG. 2B), attitude angle γ (204B of FIG. 2B), and radius R (210A).

Referring to FIG. 2B, the corresponding HRTF filters 200B for a listener at each location in the 3D space 200A may be measured, generated, saved and organized as functions of the polar coordinate system representing 3D space 200A. Each HRTF filter 200B (e.g., a pair of left and right HRTF filters) may be associated with a point on the grid (e.g., the HRTF filters are stored as a mesh) and each of the grid points may be represented by two parameters: azimuth angle θ 202B and attitude angle γ 204B. Based on a user's configuration, the system (e.g., 100A of FIG. 1A) will know the spatial relationships between each sound source (e.g., 204A) and the listener 202A, i.e., the system will know α 206A, β 208A, and R 210A. Therefore, based on θ=α, and γ=β, the system may retrieve a corresponding pair of HRTF filters 200B for the left and right ears of the listener (e.g., $HRTF_{Right}$ and $HRTF_{Left}$), for the separated sound track associated with the sound source 204A. The sound track of the sound source 204A may then be processed (e.g., by signal processing unit 106A of FIG. 1A) using the retrieved HRTF filters 200B. The output volume of the generated 3D sound may be a function of radius R 210A. The shorter the length of R 210A, the louder the output 3D sound volume.

In an implementation, for multiple sound sources like sound source 204A, the system may repeat the above filter retrieval and filtering operation for each sound source and then combine (e.g., mix) the filtered sound tracks together for the final binaural output or stereo-kind (superior to mono) outputs to two loudspeakers.

As noted above with respect to FIG. 1A, the listener 202A and/or the sound source 204A may be moving with angles θ and γ changing over time. A sequence of new pair of HRTF filters 200B may then need to be retrieved dynamically in order to output the correct binaural sound to virtually represent the sound received by the listener 202A in the 3D sound space 200A. A new pair of HRTF filters 200B may then need to be retrieved dynamically in order to output the correct binaural sound to virtually represent the sound received by the listener 202A in the 3D sound space 200A. The dynamic retrieval of the HRTF filters 200B may be facilitated by the storage of the filters as a mesh because a pair of stored HRTF filters may already be associated with any point on the grid in the 3D space where the listener and/or sound source(s) may be located during their movement.

FIG. 3 illustrates a system 300 for training a machine learning model 308 to separate mixed sound tracks, according to an implementation of the present disclosure.

Although music may be recorded on multiple tracks using multiple microphones, where each individual track represents each instrument or vocal recorded in a studio, the music streams that consumers most often get are mixed into stereo sound. The costs of recording, storage, bandwidth, transmission, and playing of multi-track audio may be very high, so most existing music recordings and communication devices (radio or smartphones) are configured for either mono or stereo sound. To generate the 3D soundstage from conventional mixed sound track formats (mono and stereo), the system (e.g., system 100A of FIG. 1A or 100B of FIG. 1B) may need to separate each mixed sound track into multiple tracks where each truck represents or isolates one kind (or category) of sound or musical instrument. The separation may be performed according to a mathematical model and a corresponding software or hardware implementation, where the input is a mixed sound track and the output is separated sound tracks. In an implementation, for stereo input, the left and right tracks may be processed (e.g., by sound separation unit 102A of FIG. 1A or sound separation unit 102B of FIG. 2B) jointly or separately.

Machine learning in this disclosure refers to methods implemented on a hardware processing device that uses statistical techniques and/or artificial neural networks to give computer the ability to "learn" (i.e., progressively improve performance on a specific task) from data without being explicitly programmed. The machine learning may use a parameterized model (referred to as "machine learning model") that may be deployed using supervised learning/semi-supervised learning, unsupervised learning, or reinforced learning methods. Supervised/semi-supervised learning methods may train the machine learning models using labeled training examples. To perform a task using supervised machine learning model, a computer may use examples (commonly referred to as "training data") to train the machine learning model and to adjust parameters of the machine learning model based on a performance measurement (e.g., the error rate). The process to adjust the parameters of the machine learning model (commonly referred to as "train the machine learning model") may generate a specific model that is to perform the practical task it is trained for. After training, the computer may receive new data inputs associated with the task and calculate, based on the trained machine learning model, an estimated output for the machine learning model that predicts an outcome for the task. Each training example may include input data and the corresponding desired output data, where the data can be in a suitable form such as a vector of numerical values or alphanumerical symbols as representation of sound tracks.

The learning process may be an iterative process. The process may include a forward propagation process to calculate an output based on the machine learning model and the input data fed into the machine learning model, and then calculate a difference between the desired output data and the calculated output data. The process may further include a backpropagation process to adjust parameters of the machine learning model based on the calculated difference.

The parameters for a machine learning model 308 for separating mixed sound tracks may be trained by machine learning, statistical, or signal processing technology. As shown in FIG. 3, the machine learning model 308 may have two phases: a training session and a separation session. During the training session for machine learning model 308, audio or music recordings of mixed sound may be used as input for feature extraction unit 302 and corresponding separated sound tracks may be used as targets by separation model training unit 304, i.e., as examples of desired separation outputs. The separation model training unit 304 may include a data processing unit including a data normalization/data perturbation unit 306, and the feature extraction unit 302. The data normalization normalizes the input training data so that they have similar dynamic ranges. The data perturbation generates reasonable data variations to cover more signal situations than are available in the training data in order to have more data for more training. The data normalization and perturbation may be optional depending on the amount of available data.

The feature extraction unit 302 may extract features from the original input data (e.g., mixed sound) in order to facilitate the training and separation computations. The training data may be processed in the time domain (raw data), frequency domain, feature do main, or time-frequency domain through the fast Fourier transform (FFT), short-time Fourier transform (STFT), spectrogram, auditory transform, wavelets, or other transforms. FIG. 4 (described more fully below) shows how both sound track separation and HRTF filtering may be conducted in a transformed domain.

The model structure and training algorithms for machine learning model 308 may be neural network (NN), convolutional neural network (CNN), deep neural network (DNN), recurrent neural network (RNN), long short-term memory (LSTM), Gaussian mixture model (GMM), hidden Markov model (HMM), or any model and/or algorithm which may be used to separate sound sources in a mixed sound track. After training, in the separation session, the input music data may be separated into multiple tracks by the trained separation model computation unit 310, each separated sound track corresponding to one kind of isolated sound. In an implementation, the multiple separated sound tracks may be mixed in different ways for different sound effects through user configuration (e.g., via GUI 110A of FIG. 1A).

In one implementation, machine learning model 300 may be a DNN or CNN that may include multiple layers, in particular including an input layer (e.g., training session) for receiving data inputs, an output layer (e.g., separation session) for generating outputs, and one or more hidden layers that each includes linear or non-linear computation elements (referred to as neurons) to perform the DNN or CNN computation propagated from the input layer to the output layer that may transform the data inputs to the outputs. Two adjacent layers may be connected by edges. Each of the edges may be associated with a parameter value (referred to as a synaptic weight value) that provide a scale factor to the output of a neuron in a prior layer as an input to one or more neurons in a subsequent layer.

Shown in FIG. 5 (described more fully below), are waveforms and corresponding spectrograms associated with a mixed sound track of music (e.g., mixed sound input) and separated sound tracks for vocals, drums, bass, and other sound, where the mixed sound track was separated using the trained machine learning model 308. The separation computation may be performed according to the system 400 shown in FIG. 4.

FIG. 4 illustrates a system 400 for separating and filtering mixed sound tracks using transformed domain sound signals, according to an implementation of the present disclosure.

The training data (e.g., time-domain mixed sound signals) may be processed separation unit 404 (like sound separation unit 102A of FIG. 1A) in the time domain (e.g., raw data) or a forward transform 402 may be used so that the training data may be processed in the frequency domain, feature domain, or time-frequency domain through the fast Fourier transform (FFT), short-time Fourier transform (STFT), spectrogram, auditory transform, wavelets, or other transforms. The HRTF filters 406 (like the ones stored in storage unit 104A of FIG. 1A) may be implemented as convolutional computation in the time domain or an inverse transform 408 may be used so that the HRTF filters 406 may be implemented as a multiplication in the frequency domain to save computation time. Accordingly, both the sound track separation and the HRTF filtering may be conducted in a transformed domain.

FIGS. 5A-5E illustrate original mixed sound in waveform and spectrogram and the mixed sound separated into vocal, drum, base, and other sound, respectively, according to implementations of the present disclosure.

Shown in FIG. 5A are a waveform and corresponding spectrogram associated with a mixed sound track of music (e.g., mixed sound input for system 100A of FIG. 1A).

Shown in FIG. 5B are a waveform and corresponding spectrogram associated with a separated sound track for vocal sounds from the mixed sound track of music.

Shown in FIG. 5C are a waveform and corresponding spectrogram associated with a separated sound track for drums sounds from the mixed sound track of music.

Shown in FIG. 5D are a waveform and corresponding spectrogram associated with a separated sound track for bass sounds from the mixed sound track of music.

Shown in FIG. 5E are a waveform and corresponding spectrogram associated with a separated sound track for other sounds (e.g., unidentified sound type) from the mixed sound track of music.

In an implementation of the present disclosure, the mixed sound track was separated using the trained machine learning model 308. The separation computation may be performed according to the system 400 described above with respect to FIG. 4.

Figure 6:
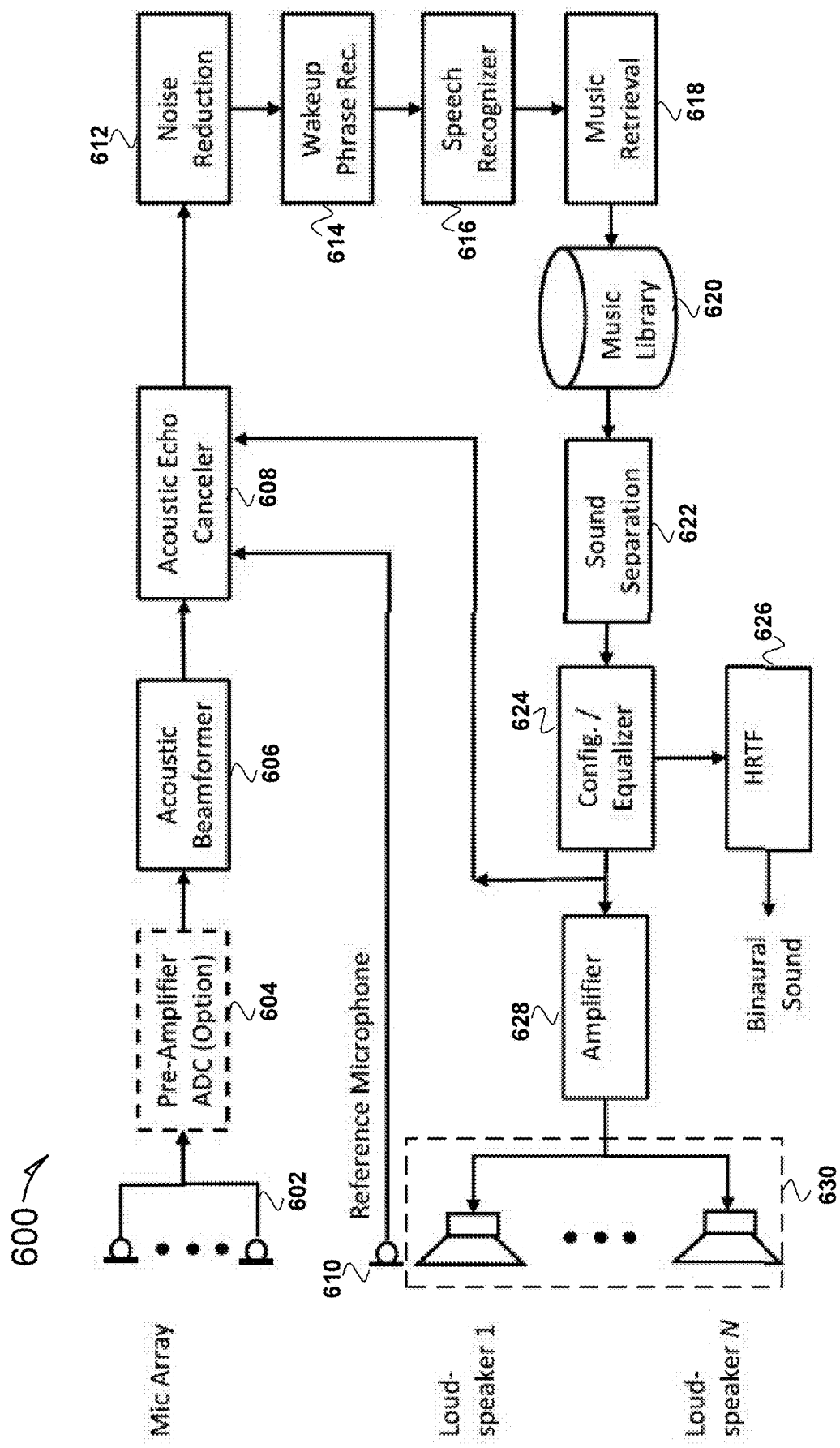
FIG. 6 illustrates far-field voice control of a 3D binaural music system with music retrieval by voice and sound separation, according to an implementation of the present disclosure.

FIG. 6 illustrates far-field voice control of a 3D binaural music system 600 with sound separation, according to an implementation of the present disclosure.

As an initial matter, microphone array 602 may capture a voice command. The pre-amplifiers/analog to digital converters (ADC) 604 may enlarge the analog signal and/or convert it to a digital signal. Both the pre-amplifier and ADC are optional depending on the what kind of microphones are used in microphone array 602. For example, they may not be needed by digital microphones.

The acoustic beamformer 606 forms acoustic beam(s) to enhance the voice or voice command and to suppress any background noise. An acoustic echo canceller (AEC) 608 further cancels the loudspeaker sound (e.g., from loudspeakers 630) captured by the microphone array 602 using reference signals. The reference signal may be captured by one or more reference microphones 610 near the loudspeakers 630 or from the audio signals (e.g., from configuration/equalizer unit 624) prior to sending to sending them to the amplifier 608 for the loudspeakers 630. The output from the AEC may then be sent to the noise reduction unit 612 to further reduce the background noise.

The clean speech is then sent to the wakeup phrase recognizer 614 which may recognize a pre-defined wakeup phrase for system 600. The system 600 may mute the loudspeakers 630 to further improve voice quality. The automatic speech recognizer (ASR) 616 may then recognize the voice command, such as a song music title, and then instructs a music retrieval unit 618 to retrieve the music from a music library 620. In an implementation, the wakeup phrase recognizer 614 and ASR 616 may be combined as one unit. Furthermore, the retrieved music may then be separated by the sound separation unit 622 that may be like sound separation unit 102A of FIG. 1A.

A configuration/equalizer unit 624 may then adjust the volume of each sound source and/or conduct equalization (gain of each frequency band or each instrument or vocal) of each sound track. Finally, the separated music sound tracks may be played from the loudspeakers 630 (via amplifier 628) as direct 3D sound as shown in system 100B of FIG. 1B or HRTF filters 626 may be used to process the separated sound tracks in order to generate binaural sound as shown in system 100A of FIG. 1A.

Figure 15:
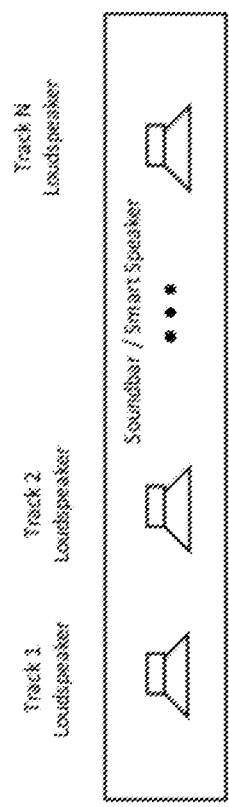
FIG. 15 illustrates a loudspeaker distribution in a sound bar according to an implementation of the present disclosure.
Figure 16:
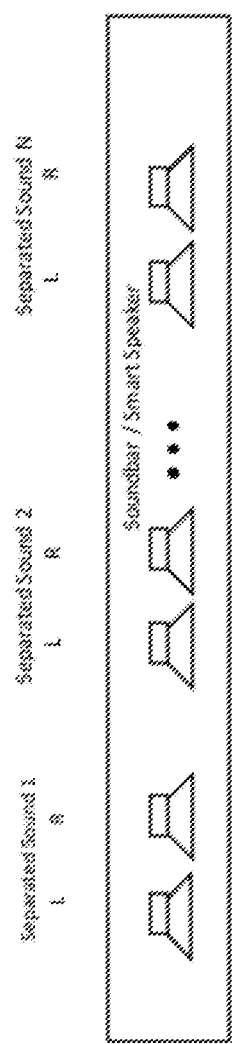
FIG. 16 illustrates a loudspeaker distribution in a sound bar with separated stereo plus sound according to an implementation of the present disclosure.
Figure 17:
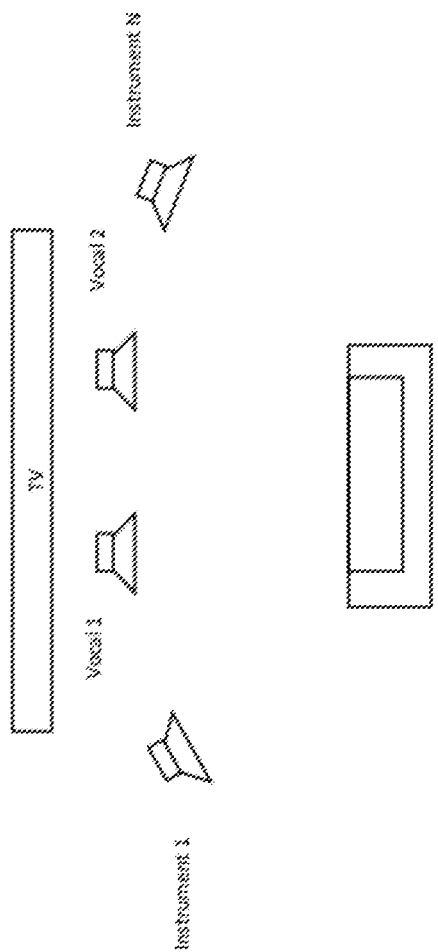
FIG. 17 illustrates a loudspeaker distribution for a TV or a movie theater according to an implementation of the present disclosure.
Figure 18:
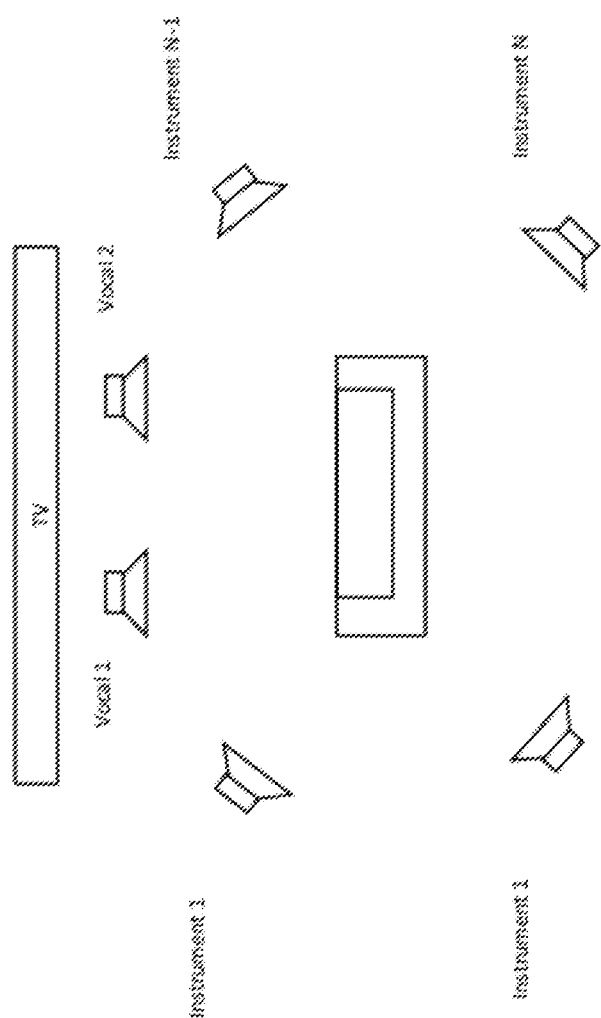
FIG. 18 illustrates a loudspeaker distribution for a TV or a movie theater according to another implementation of the present disclosure.

A few implementations of loudspeaker layouts are shown in FIGS. 8-11. FIG. 15 illustrates a loudspeaker distribution in a sound bar according to an implementation of the present disclosure. In this implementation, each speaker may output sound from a corresponding sound track (e.g., Track 1, Track 2, . . ., Track N). The sound bar may include an array of loudspeakers or smart speakers. Similarly, FIG. 16 illustrates an example of loudspeaker distribution in a sound bar with separated stereo plus sound according to an implementation of the present disclosure. In this implementation, each pair may include a left speaker for playing the left sound track and a right speaker for playing the right sound track. The 3D sound separation and voice retrieval system can also be applied to TV and home theaters. The sound from TV, cable, DVD, or CD can be separated, for example, by ways as shown in FIG. 1B and played from a group of loudspeakers, like a sound bar, or referred to as examples of loudspeaker arrays as shown in FIGS. 17-18. FIGS. 17-18 illustrate loudspeaker distributions for a TV or a movie theater according to implementations of the present disclosure. FIG. 17 illustrates a setting in which speakers facing the audience from the TV, and FIG. 18 illustrates a setting in which speakers surrounding the audience. Each loudspeaker or a pair of loudspeakers (L, R) can play the audio of one kind of sound, such as vocal or music instrument, or in any combinations as needed or as user configured.

Figure 19:
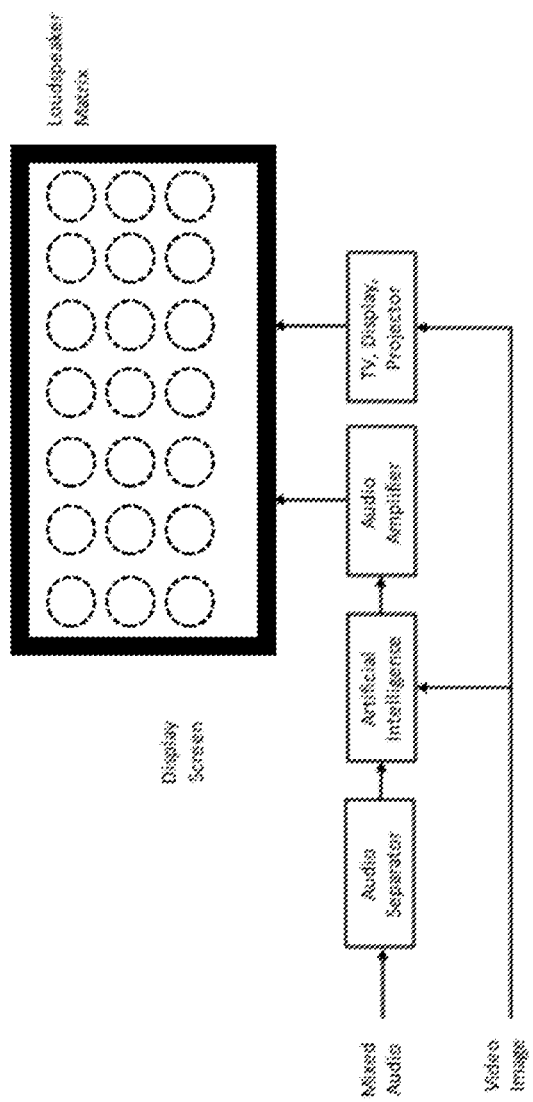
FIG. 19 illustrates a speaker matrix deployed with a TV or a movie theater according to an implementation of the present disclosure.

FIG. 19 illustrates a loudspeaker matrix deployed with a TV or a movie theater according to an implementation of the present disclosure. As shown in FIG. 19, another implementation is to place a 2D loudspeaker matrix behind a theater screen or by using a flat, transparent, and screen top loudspeaker array. Thus, when a person (or sound generating entity) on the screen is talking, the loudspeakers at locations corresponding to the person may play the voice sound of the person. For example, when watching a band, the music can come from loudspeakers at locations corresponding to the singer(s) and/or corresponding to instrumentalist(s) as shown in FIG. 19. The information of sound coordinates or locations on the screen can be determined by intelligent algorithms using artificial intelligence (AI) to recognize the sound location from video images and sound type, or by 3D microphones which record sound with sound location information of the sound.

FIGS. 7A-7D illustrate a GUI 700 for user configuration of 3D sound with selected listener positions inside a band formation (7A-7C) and in the front of the band formation (7D), respectively, according to implementations of the present disclosure.

In an implementation, the GUI 700 may be configured so that all sound sources (e.g., from a music band on stage) are represented by band member icons on a virtual stage and the listener is represented by a listener head icon (wearing headphones to accentuate the position of the left and right ears) that may be moved freely around the stage by a user of GUI 700. In another implementation, all the icons in FIG. 7A-7D can be moved freely around the stage though touches by a user of GUI 700.

In FIG. 7A, based on the listener head icon being placed at the center of the virtual stage, the listener may hear the binaural sound and feel the sound field: the vocal sound is perceived as coming from the front, the drum sounds from the right, the bass sounds from the back, and other instruments (e.g., keyboard) from the left.

In FIG. 7B, based on the listener head icon being placed on top of the band drummer icon, the listener may be able to hear the separated drums solo track.

In FIG. 7B, based on the listener head icon being placed closer to the drummer and bassist icons, the sounds of drums and bass may be enhanced (e.g., increased volume) while the sound from other instruments (e.g., vocals and other) may be relatively reduced (e.g., decreased volume), thus, the listener may feel the enhanced bass and beat impact through configuration via GUI 700.

In FIG. 7D another virtual 3D sound field configuration is shown. In this configuration, the listener may virtually feel and hear that the band is in the front of her or him even when that is not the case in the real world music stage recording. The locations of all band member icons and the listener head icon may be moved anywhere on the GUI 700 display in order to configure and change the virtual sound field and hearing experience.

The GUI 700 may also be applicable on a remote to control a TV with direct 3D sound systems, or other such applications. For example, when a user is watching a move, she or he may move the listener head icon closer to a vocal icon so that the volume of the voice is increased while the volume of other background sounds (e.g., music) may be reduced so that the user may hear a clearer voice.

Figure 8:
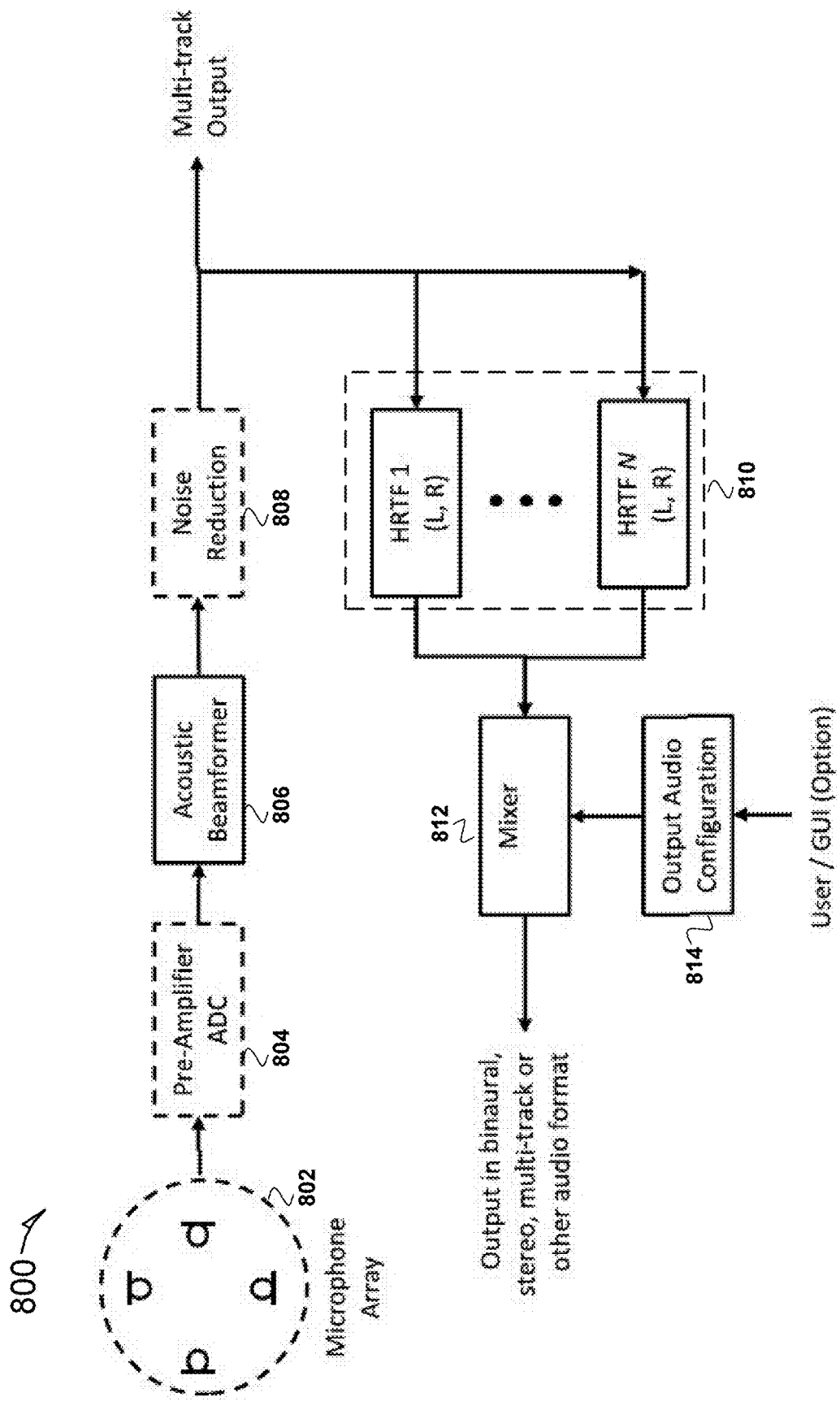
FIG. 8 illustrates a system for generating 3D sound with a microphone array, according to an implementation of the present disclosure.

FIG. 8 illustrates a system 800 for generating 3D sound with a microphone array 802, according to an implementation of the present disclosure.

The system 800 may be described as a 3D microphone system which may capture and output 3D and binaural sound directly. As referred to herein, a 3D microphone system may comprise a microphone array system which may capture sounds from different directions together with spatial information regarding the location of the sources of the sounds. The system 800 may produce two kinds of outputs: (1) multiple tracks, each corresponding to the sound from one direction where each of the multiple tracks may drive a group of loudspeakers to represent a 3D sound field; and (2) binaural L and R tracks for earbuds or earphones to virtually represent the 3D sound field.

Each microphone of microphone array 802 may have their signals processed by a pre-amplifier/ADC unit 804. The pre-amplifiers and analog to digital converters (ADC) may enlarge the analog signal and/or convert it to a digital signal. Both the pre-amplifier and ADC are optional and may depend on the selected microphone components for microphone array 802. For example, they may not be necessary for digital microphones.

Figure 9A:
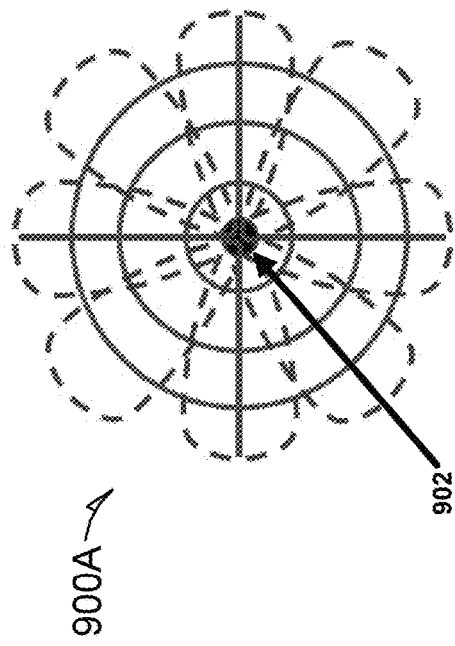
FIGS. 9A-9B illustrate beam patterns for a 3D microphone and a 3D microphone array with spatial noise cancellation, respectively, according to implementations of the present disclosure.
Figure 9B:
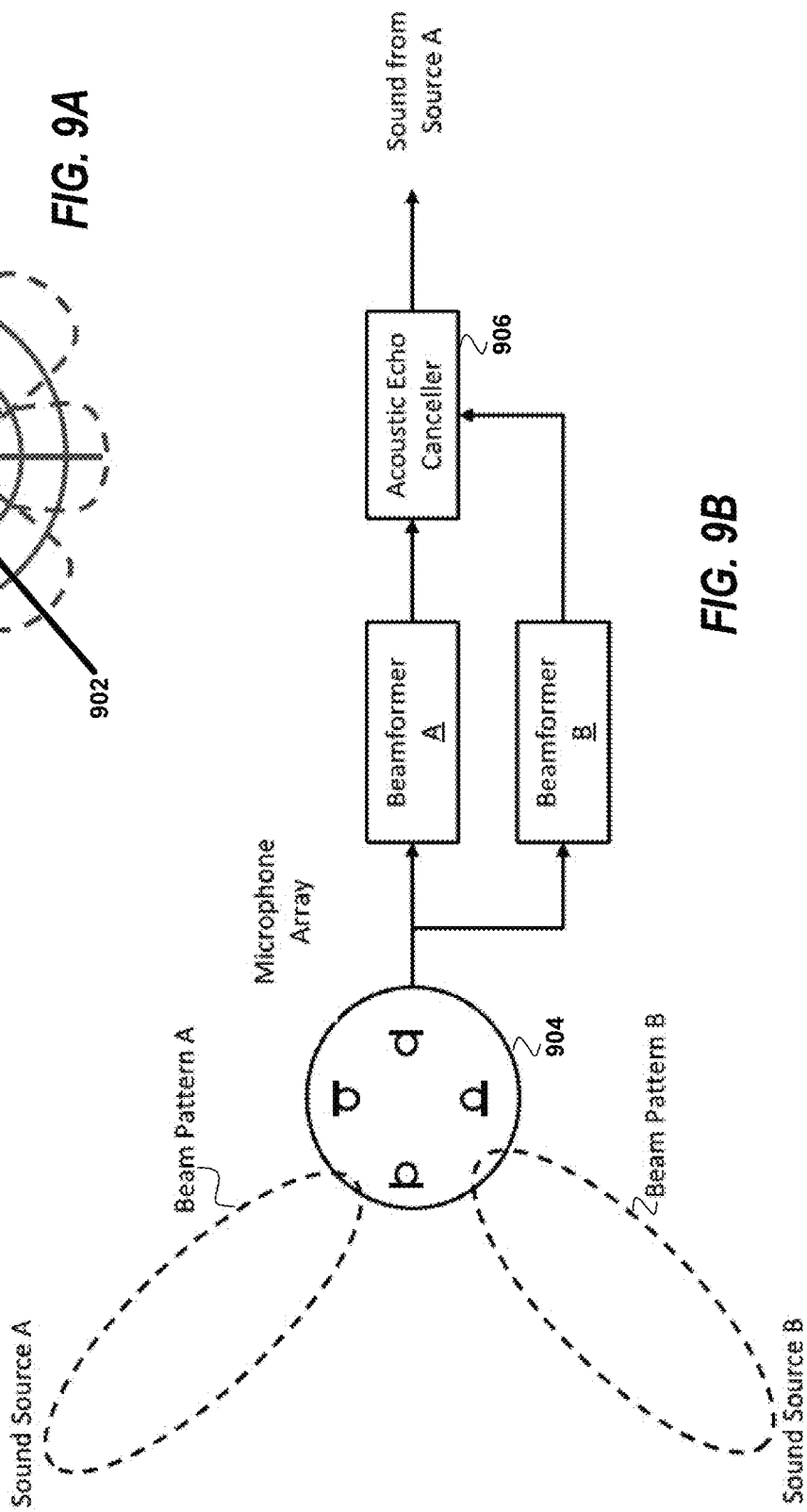

The acoustic beamformer 806 may form acoustic beam patterns pointing to different directions or different sound sources, simultaneously, as shown in FIG. 9B. Each of the beams enhance the sound from the "look" direction while suppressing the sound from other directions, to improve a signal to noise ratio (SNR) and to isolate the sound coming from the "look" direction from the sound coming from other directions. A noise reduction unit 808 may further reduce the background noise of the beamformer outputs if needed. The output from the beamformer may comprise multiple sound tracks corresponding to sounds coming from different directions.

In order to generate direct 3D sound, the multiple tracks may drive multiple amplifiers and loudspeakers to construct a 3D sound field for listeners.

In order to generate binaural output, the multiple sound tracks may go through multiple pairs of selected HRTF filters 810 to convert the spatial sound track to binaural sound. The HRTF filters may be selected based on a user's configuration (e.g., via output audio configuration unit 814) or based on the actual spatial locations of the sound sources in the real world. Furthermore, a mixer 812 may then combine the HRTF outputs to a pair of binaural output for left and right ears, respectively. The final binaural output represents the 3D sound field recorded by the microphone array 802.

Based on the microphone array 802 only having two acoustic beam patterns, pointing to left and right respectively, the microphone array works as a stereo microphone, which is a special case of the 3D microphone.

FIGS. 9A-9B illustrate beam patterns for a 3D microphone 902 and a 3D microphone array 904 with spatial noise cancellation, respectively, according to implementations of the present disclosure.

FIG. 9A shows beam patterns 902 for a 3D microphone 902 which may capture sound from different directions and spatial information regarding the sound sources.

FIG. 9B shows a microphone array 904 (e.g., comprising a plurality of microphones 902) configured to capture sounds from two different sound sources A and B with beam patterns A and B formed by respective beamformers A and B. The sound captured from sound source A in the "look" direction of one acoustic beam, such as Beam Pattern A, often mixes with the sound captured from other directions, such as the direction of sound source B. In order to cancel the sound coming from other directions, the 3D microphone array 904 may form another beam pattern(s) using the same microphone array 904, such as Beam Pattern B. The sound captured by Beam Pattern B may be used to cancel unwanted mixed in sound captured by Beam Pattern A. Sound from the direction of sound source B that has been mixed in with sound from Beam Pattern A's "look" direction may then be cancelled from the output of Beam Pattern A. The cancellation algorithm may be provided by an acoustic echo canceller (AEC) unit 906.

Figure 10:
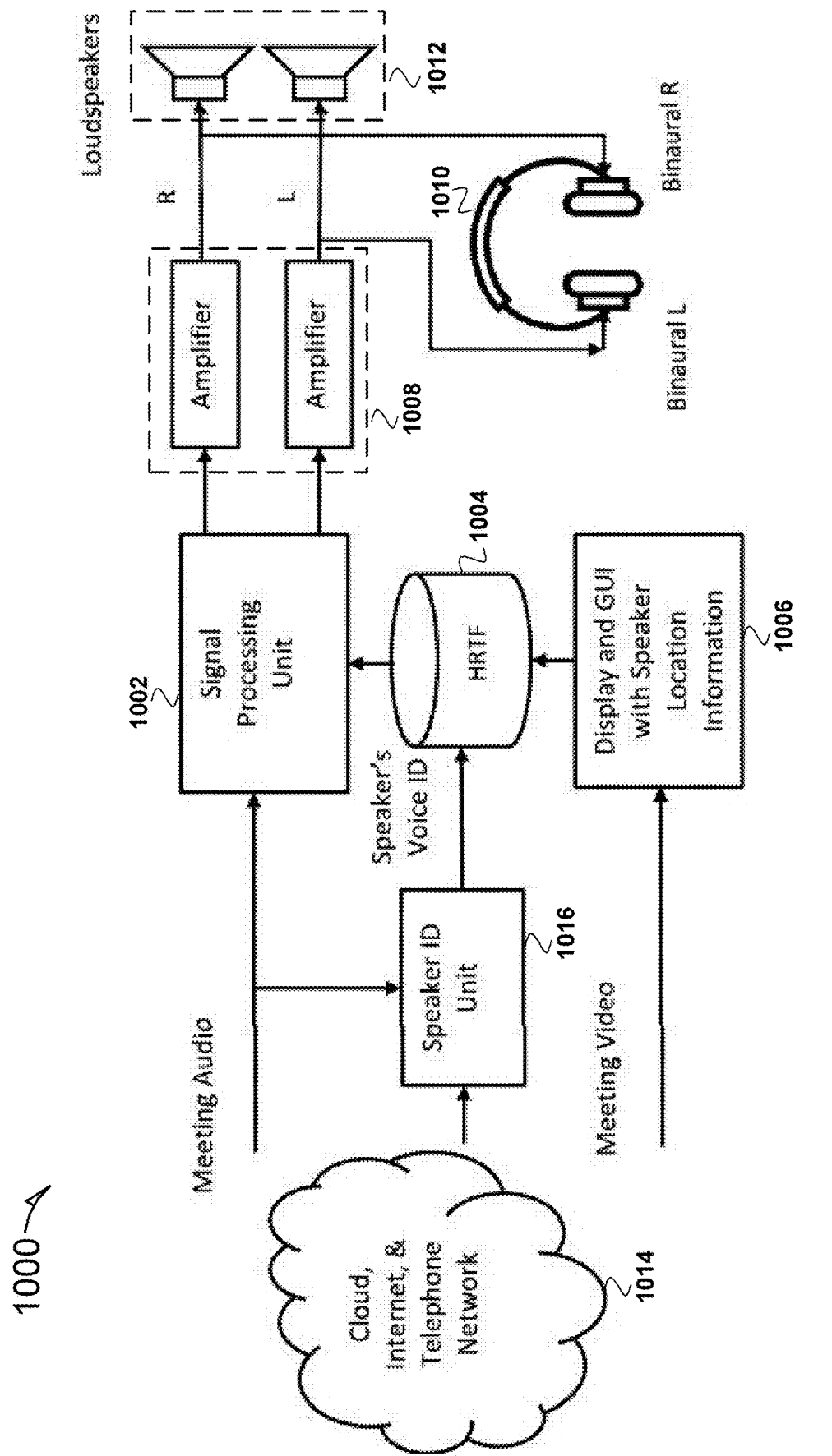
FIG. 10 illustrates a conference or virtual concert system for generating three-dimensional sound, according to implementations of the present disclosure.

FIG. 10 illustrates a conference system 1000 for generating three-dimensional sound, according to implementations of the present disclosure.

The conference system 1000 may include a signal processing and computation unit 1002, a bank 1004 of head related transfer functions (HRTF) filters, a display unit with graphical user interface (GUI) 1006, amplifiers 1008, headset or earphones 1010, and loudspeakers 1012. The system 1000 may be implemented, for example, as software on a user's laptop, tablet, computer, or smartphone with a connected headset. The video and audio conference, hereinafter referred to as the "conference", may also be referred to as a teleconference, virtual conference, web conference, webinar, or video conference. One such conference may include multiple local and/or multiple remote attendees. In an implementation, the attendees may be connected by internet and telephone networks 1014. In an implementation the conference may be controlled by cloud servers or remote servers via the internet and telephone networks 1014.

A user of system 1000 may be one of the attendees of a conference or virtual concert. She or he is the owner of the laptop, tablet, computer, or smartphone running the conference software with video and audio and possibly wearing headset 1010. The terms "speakers" or "attendees" refer to persons attending the conference. The loudspeakers 1012 may be any devices which can convert an audio signal to audible sound. The amplifiers 1008 may be an electronic device or circuit to increase the signal power to drive the loudspeakers 1012 or the headset 1010. The headset 1010 may be headphones, ear caps, or in-ear audio devices.

The input signals (e.g., from the cloud via 1014) may include video, audio and the speaker's identification (ID). The speaker's ID may associate video and audio input to an attendee who is speaking. Based on a speaker's ID not being available, a new speaker ID may be generated by the speaker ID unit 1016 as described below.

The speaker ID unit 1016 may obtain a speaker ID from the conference software based on the speaker ID used for the speaker's videoconference session. Furthermore, the speaker ID unit 1016 may obtain a speaker ID from a microphone array (e.g., microphone array 802 of FIG. 8 or 904 of FIG. 9). For example, the microphone array beam patterns in FIG. 9B (e.g., beam patterns A and B) may detect the direction of the speaker with respect to the microphone array. Based on the detected direction, the system 1000 may detect the speaker ID. Still further, the speaker ID unit 1016 may obtain a speaker ID based on a speaker ID algorithm. For example, based on a sound track consisting of multiple speaker's voices, a speaker ID system may have two sessions, training and inference. During training, using available labels, each speaker's voice is used to train a speaker dependent model, one model for one speaker. If the label is not available, the speaker ID system may perform unsupervised training first and then label a voice from the sound track with speaker ID, following by supervised training to generate one model per speaker. During inference, given the conference audio, the speaker identification unit 1016 may use the trained model to process the input sounds and identify the corresponding speaker. The model may be Gaussian mixture model (GMM), hidden Markov model (HMM), DNN, CNN, LSTM, or RNN.

Based on an attendee speaking, a video window associated with the attendee may be highlighted visually in the display/GUI 1006, so the user knows which attendee of the conference is speaking, e.g., Attendee 2 in FIG. 11 described below. From the location of the speaker, for example, 50 degrees angle from the user, the system 1000 may retrieve a pair of corresponding HRTF filters from pre-stored database or memory 1004. The signal processing unit 1002 may perform a convolution computation on the input mono signal with the HRTF filters from pre-stored database or memory 1004. The output from the signal processing and computation unit 1002 may have two channels of binaural sounds for left and right ears, respectively. A user or attendee may wear the headset unit 1010 in order to hear binaural sound and experience 3D sound effects. For example, a user that is not looking at the display 1006 but is wearing the headset 1010 may still perceive which attendee is speaking based on the 3D sound so that the user may feel as if she or he is in a real conference room.

Based on multiple display/GUIs 1006 and multiple loudspeakers 1012 being used in a real conference room, each loudspeaker 1012 may be dedicated to one speaker's sound in one display/GUI 1006 at one location. In this situation, the user does not need to use a headset 1010 and she or he may experience 3D sound from the loudspeakers 1012. The polarity of loudspeakers can be placed in a home theater, a movie theater, a soundbar, a TV set, a smart speaker, a smartphone, a mobile device, a handheld device, a laptop computer, a PC, an automobile vehicle or anywhere with more than one loudspeakers or sound generators.

Figure 11:
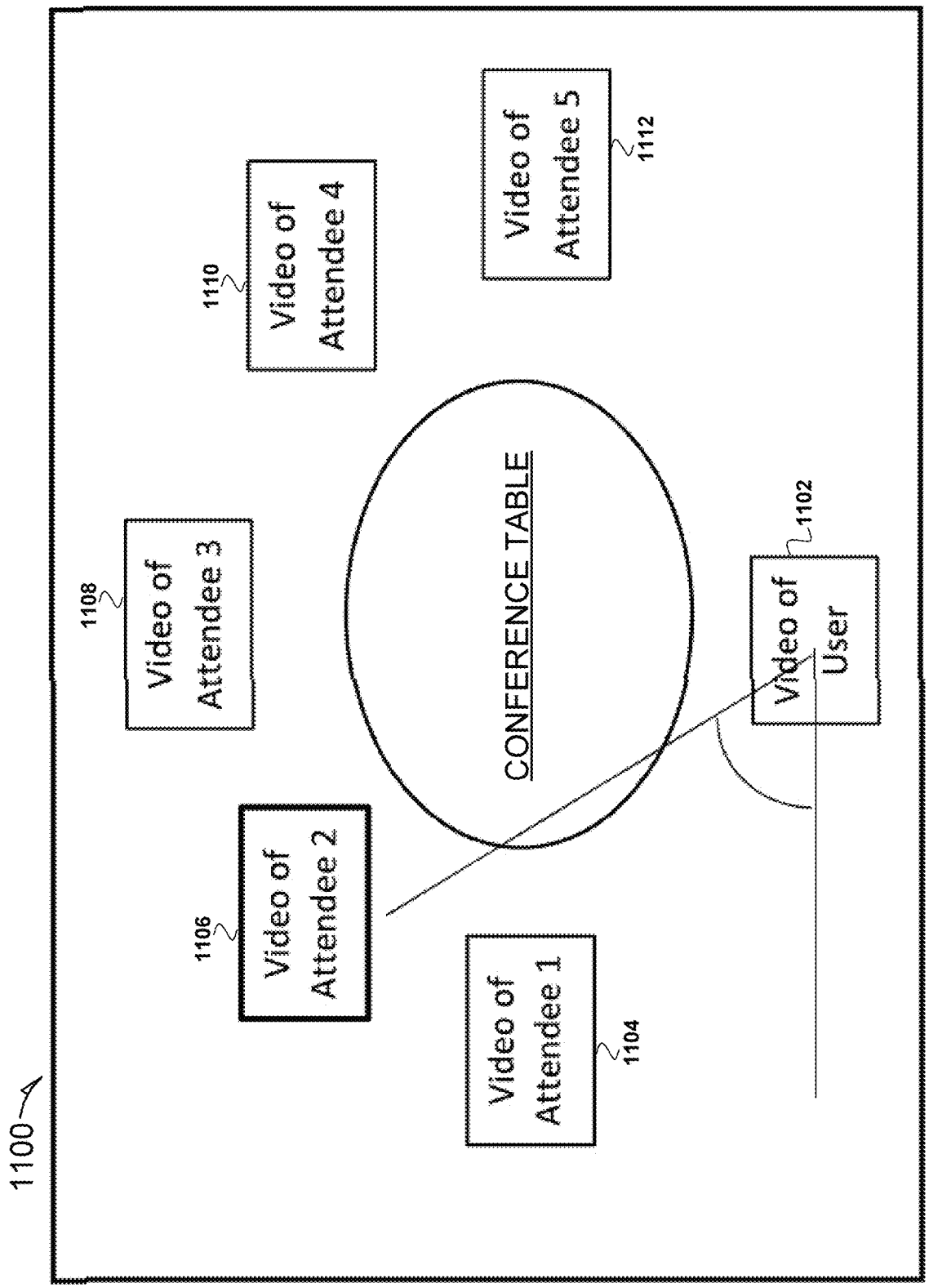
FIG. 11 illustrates a virtual conference room displayed for a GUI of a conference system for generating three-dimensional sound, according to implementations of the present disclosure.

FIG. 11 illustrates a virtual conference room 1100 displayed for a GUI 1006 of a conference system 1000 for generating three-dimensional sound, according to implementations of the present disclosure.

The virtual conference room 1100 may have multiple windows (1102-1112) including video of the user and meeting attendees. The locations of the windows (1102-1112) may be assigned by the conference software (e.g., running on laptop) or by the user (e.g., via a display/GUI 1006 of FIG. 10). For example, the user may move the windows (1102-1112) around to arrange the virtual conference room 1100. In an implementation, the center of conference room 1100 may include a virtual conference table.

As noted above, Furthermore, the virtual conference room 1100 may be configured by the user so that the video windows (1104-1112) of the attendees may be placed virtually anywhere in the virtual conference room 1100 with a mouse, keypad, or touch screen, etc. From the relative location of a speaker (e.g., attendee 2) to the user (e.g., angle from video window 1106 of attendee 2 to video window 1102 of the user), related HRTF's may be selected and applied automatically for attendee 2 when they are speaking.

Methods

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

The methods may be performed by processing devices that may comprise hardware (e.g., circuitry, dedicated logic), computer readable instructions (e.g., run on a general purpose computer system or a dedicated machine), or a combination of both. The methods and each of their individual functions, routines, subroutines, or operations may be performed by one or more processors of the computer device executing the method. In certain implementations, the methods may be performed by a single processing thread. Alternatively, the methods may be performed by two or more processing threads, each thread executing one or more individual functions, routines, subroutines, or operations.

Figure 12:
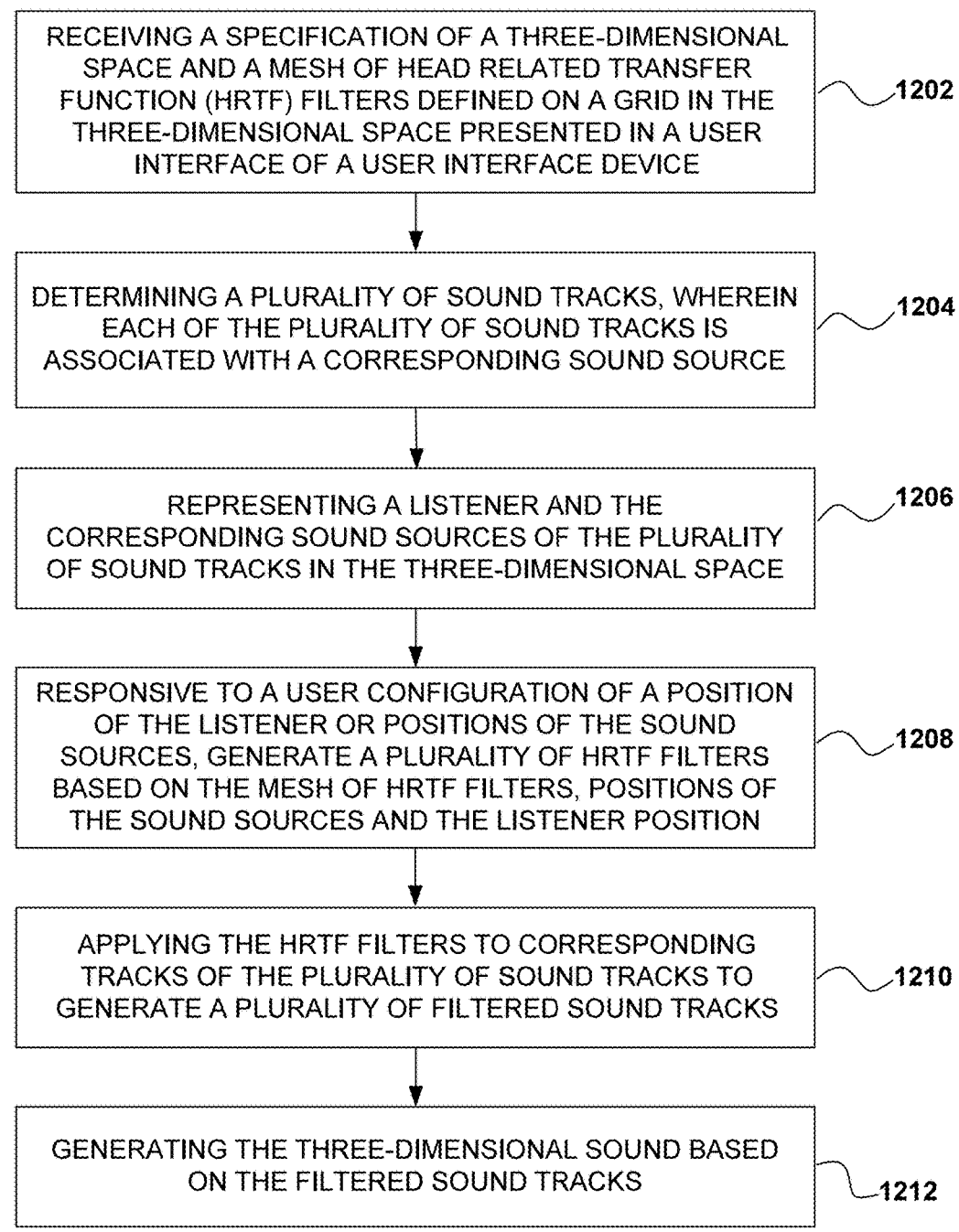
FIG. 12 illustrates a method for generating three-dimensional sound, according to an implementation of the present disclosure.

FIG. 12 illustrates a method 1200 for generating three-dimensional sound, according to an implementation of the present disclosure.

In one implementation, method 1200 may be performed by the signal processing units of system 100A of FIG. 1A or subsystem 100B of FIG. 1B.

At 1202, the method includes receiving a specification of a three-dimensional space (e.g., 200A of FIG. 2A) and a mesh of head related transfer function (HRTF) filters (e.g., 200B of FIG. 2B) defined on a grid in the three-dimensional space, wherein the three-dimensional space is presented in a user interface of a user interface device (e.g., GUI 110A of FIG. 1A).

At 1204, the method includes determining (e.g., by sound separation unit 102A of FIG. 1A) a plurality of sound tracks (e.g., separated sound tracks), wherein each of the plurality of sound tracks is associated with a corresponding sound source (e.g., vocal).

At 1206, the method includes representing a listener (e.g., listener 202A of FIG. 2A) and the sound sources (e.g., sound source 204A of FIG. 2A) of the plurality of sound tracks in the three-dimensional space.

At 1208, the method includes generating, responsive to a user configuration (e.g., via GUI 110A of FIG. 1A) of at least one of a position of the listener or positions of the sound sources in the three-dimensional space, a plurality of HRTF filters (e.g., 200B of FIG. 2B) based on the mesh of HRTF filters (e.g., stored in storage unit 104A of FIG. 1A) and the positions of the sound sources and the listener in the three-dimensional space.

At 1210, the method includes applying each of the plurality of HRTF filters (e.g., 200B of FIG. 2B) to a corresponding one of the plurality of separated sound tracks to generate a plurality of filtered sound tracks; and At 1212, the method includes generating the three-dimensional sound based on the filtered sound tracks.

Figure 13:
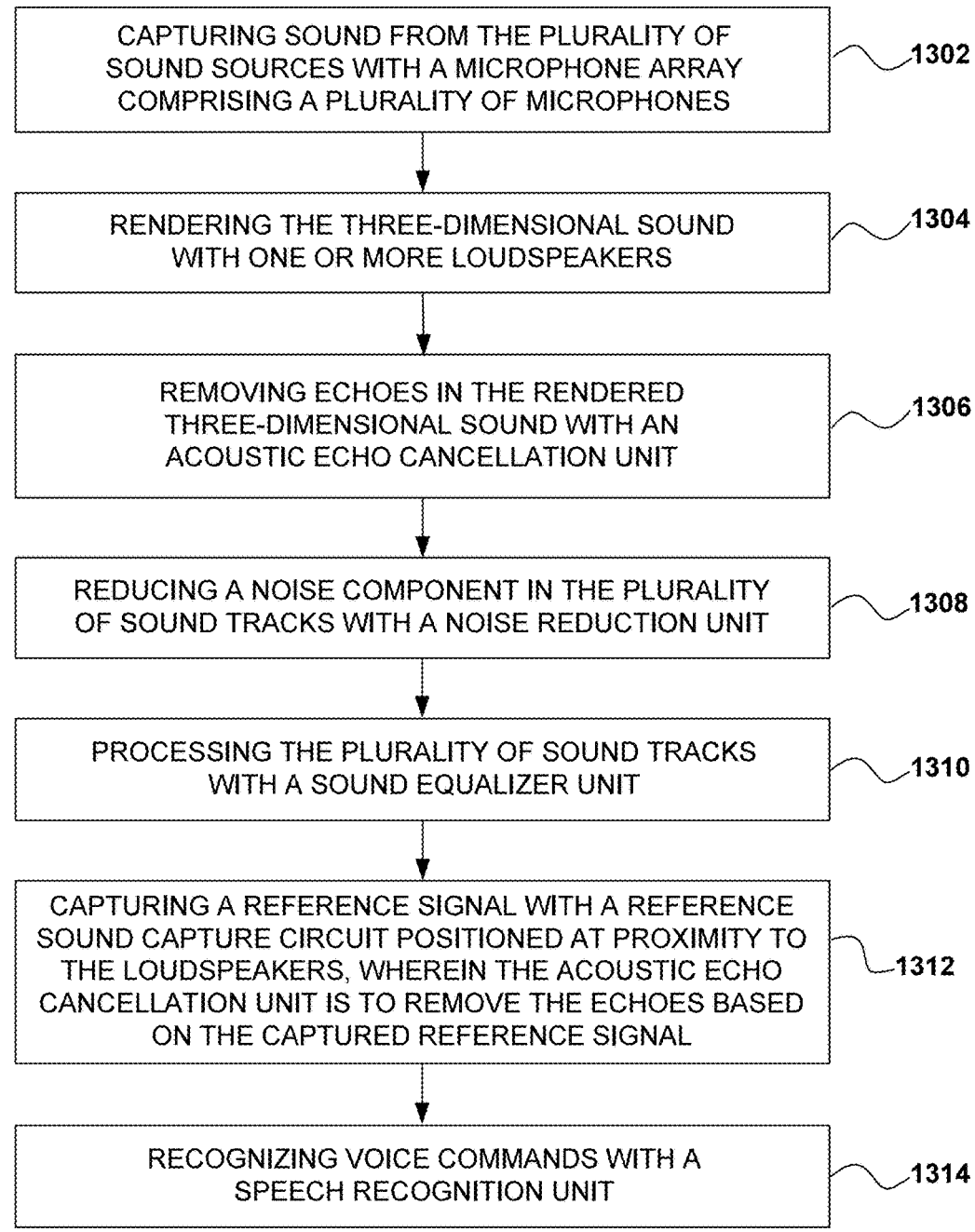
FIG. 13 illustrates a method for generating three-dimensional sound, according to an implementation of the present disclosure.

FIG. 13 illustrates a method 1300 for generating three-dimensional sound, according to an implementation of the present disclosure.

At 1302, the method includes capturing sound from the plurality of sound sources with a microphone array (e.g., microphone array 802 of FIG. 8) comprising a plurality of microphones (e.g., microphone 902 of FIG. 9A).

At 1304, the method includes rendering the three-dimensional sound with one or more loudspeakers (e.g., loudspeakers 108B of FIG. 1B).

At 1306, the method includes removing echoes in the plurality of sound tracks with an acoustic echo cancellation unit (e.g., AEC 608 of FIG. 6).

At 1308, the method includes reducing a noise component in the plurality of sound tracks with a noise reduction unit (e.g., noise reduction unit 612 of FIG. 6).

At 1310, the method includes processing the plurality of sound tracks with a sound equalizer unit (e.g., configuration/equalizer unit 624 of FIG. 6).

At 1312, the method includes capturing a reference signal with a reference sound capture circuit (e.g., reference microphone 610 of FIG. 6) positioned at proximity to the one or more loudspeakers (e.g., loudspeakers 630 of FIG. 6), wherein the acoustic echo cancellation unit (e.g., AEC 608 of FIG. 6) is to remove the echoes based on the captured reference signal.

At 1314, the method includes recognizing voice commands with a speech recognition unit (e.g., speech recognizer 616 of FIG. 6).

Hardware

Figure 14:
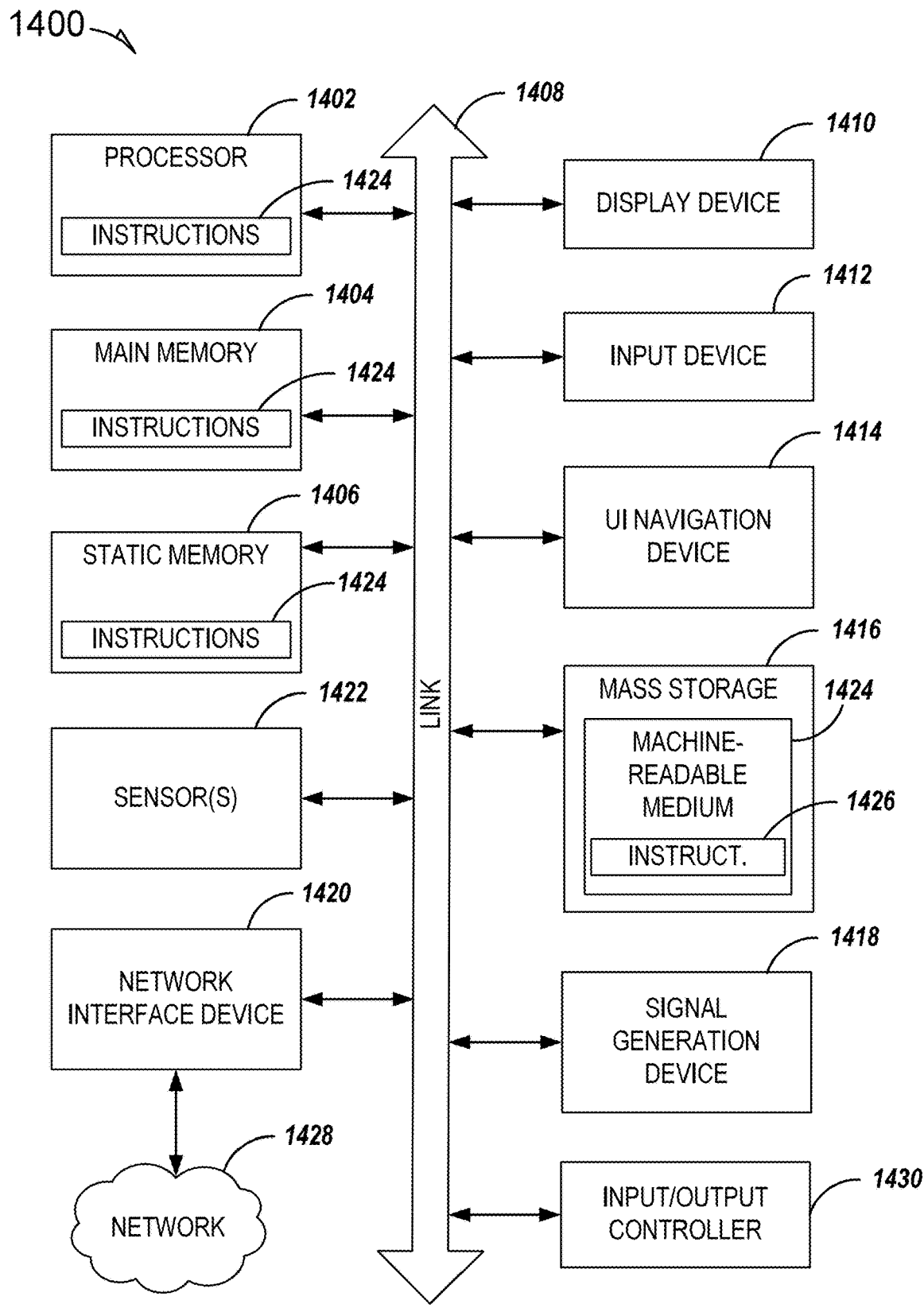
FIG. 14 illustrates a block diagram of hardware for a computer system operating in accordance with one or more implementations of the present disclosure.

FIG. 14 depicts a block diagram of a computer system 1400 operating in accordance with one or more aspects of the present disclosure. In various examples, computer system 1400 may correspond to any of the signal processing units/devices described in relation to the systems presented herein, such as system 100A of FIG. 1A or system 100B of FIG. 1B.

In certain implementations, computer system 1400 may be connected (e.g., via a network, such as a Local Area Network (LAN), an intranet, an extranet, or the Internet) to other computer systems. Computer system 1400 may operate in the capacity of a server or a client computer in a client-server environment, or as a peer computer in a peer-to-peer or distributed network environment. Computer system 1400 may be provided by a personal computer (PC), a tablet PC, a set-top box (STB), a Personal Digital Assistant (PDA), a cellular telephone, a web appliance, a server, a network router, switch or bridge, a computing device in vehicle, home, room, or office, or any device capable of executing a set of instructions (sequential or otherwise) that specify actions to be taken by that device. Further, the term "computer" shall include any collection of computers, processors, or SoC, that individually or jointly execute a set (or multiple sets) of instructions to perform any one or more of the methods described herein.

In alternative embodiments, the machine operates as a standalone device or may be connected (e.g., networked) to other machines. In a networked deployment, the machine may operate in the capacity of either a server or a client machine in server-client or cloud network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer or cloud server) to individually or jointly execute instructions to perform any one or more of the methodologies discussed herein.

Example computer system 1400 includes at least one processor 1402 (e.g., a central processing unit (CPU), a graphics processing unit (GPU) or both, processor cores, compute nodes, cloud server, etc.), a main memory 1404 and a static memory 1406, which communicate with each other via a link 1408 (e.g., bus). The computer system 1400 may further include a video display unit 1410, an alphanumeric input device 1412 (e.g., a keyboard), and a user interface (UI) navigation device 1414 (e.g., a mouse). In one embodiment, the video display unit 1410, input device 1412 and UI navigation device 1414 are incorporated into a touch screen display. The computer system 1400 may additionally include a storage device 1416 (e.g., a drive unit), a sound production device 1418 (e.g., a speaker), a network interface device 1420, and one or more sensors 1422, such as a global positioning system (GPS) sensor, accelerometer, gyrometer, position sensor, motion sensor, magnetometer, or other sensors.

The storage device 1416 includes a machine-readable medium 1424 on which is stored one or more sets of data structures and instructions 1426 (e.g., software) embodying or utilized by any one or more of the methodologies or functions described herein. The instructions 1426 may also reside, completely or at least partially, within the main memory 1404, static memory 1406, and/or within the processor 1402 during execution thereof by the computer system 1400, with main memory 1404, static memory 1406, and processor 1402 comprising machine-readable media.

While the machine-readable medium 1424 is illustrated in an example embodiment to be a single medium, the term "machine-readable medium" may include a single medium or multiple media (e.g., a centralized, cloud, or distributed database, and/or associated caches and servers) that store the one or more instructions 1426. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include volatile or non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; and CD-ROM and DVD-ROM disks.

The instructions 1426 may further be transmitted or received over a communications network 1428 using a transmission medium via the network interface device 1420 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog signals or other intangible medium to facilitate communication of such software.

Example computer system 1400 may also include an input/output controller 1430 to receive input and output requests from the at least one central processor 1402, and then send device-specific control signals to the device they control. The input/output controller 1430 may free the at least one central processor 1402 from having to deal with the details of controlling each separate kind of device.

Language

Unless specifically stated otherwise, terms such as "receiving," "associating," "determining," "updating" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

The invention claimed is:

1. A three-dimensional sound generation system, comprising:
   one or more processing devices, communicatively coupled to a user interface device, to:
   receive a sound stream that is composed of the one or more sound sources, wherein each of the one or more sound sources corresponds to a respective sound type;
   obtain a specification/pre-configuration of a three-dimensional space comprising a listener position and one or more sound source locations;
   present, in a user interface of the user interface device, graphical representations representing a listener at the listener location in the three-dimensional space and the one or more sound sources at the one or more sound source locations;
   receive, using the user interface, a configuration directed at a graphical representation of at least one of the listener location or one or more graphical representations of the one or more sound source locations;
   responsive to receiving the configuration, generate, using the sound stream based on the listener location and the one or more sound source locations, one or more channels of sound signals for driving one or more loudspeakers; and
   provide the one or more channels of sound signals to the one or more loudspeakers to generate a three-dimensional sound field that renders a sound effect as if the listener at the listener position listens to the one or more sound sources at the one or more sound source locations in the three-dimensional space.

2. The sound generation system of claim 1, wherein the sound stream includes at least one of a mono or stereo sound stream, the sound generation system comprises a screen/display and a matrix of loudspeakers/sound generators, and the matrix of loudspeakers/sound generators are aligned with the area of the screen/display, and wherein the matrix of loudspeakers/sound generators are arranged behind or attached to the screen/display or are an array of flat, transparent, and screen top loudspeakers/sound generators, wherein the processing device is further to:

obtain a video stream that is associated with the audio stream;

determine, based on content of the video stream, the one or more sound source locations of the one or more sound sources on the screen/display that presents the content of the video stream;

determine, from the matrix of loudspeakers/sound generators, the one or more loudspeakers/sound generators that correspond to the one or more sound source locations of the one or more sound sources on the screen/display; and provide the one or more channels of sound signals to the one or more loudspeakers/sound generators to generate the three-dimensional sound field.

3. The sound generation system of claim 1, wherein the sound type comprises one or more of a voice sound, a vocal sound, an instrument sound, a car sound, a helicopter sound, an airplane sound, a vehicle sound, a gunshot sound, a footstep sound, an explosion sound, a sound in a movie, a sound in a game, or an environmental sound.

4. The sound generation system of claim 1, further comprising:

a microphone array comprising a plurality of microphones, wherein the processing device is to:

implement one or more beamformers, wherein each of the one or more beamformers is configured to capture sound from a corresponding direction with the microphone array; and generate the one or more sound sources each corresponding to one of beamformer outputs.

5. The sound generation system of claim 4, wherein the microphone array is mounted on an audio/video headset, earphones, eye glasses, a wearable apparatus, a stand, a device, a helmet, or a desktop.

6. The sound generation system of claim 1, wherein the three-dimensional space further comprises one or more loudspeaker positions, wherein to present, in a user interface of the user interface device, graphical representations representing a listener at the listener location in the three-dimensional space and the one or more sound sources at the one or more sound source locations, the processing device is to:

present, in the user interface, icons representing the listener at the listener position, and the one or more sound sources at the one or more sound source locations in the three-dimensional space, wherein each of the icons is at least one of a symbol representation, an image of a corresponding source, a video of the corresponding sound source, or an animation.

7. The sound generation system of claim 1, wherein to provide the one or more channels of sound signals, the processing device is to provide the one or more channels of sound signals to one or more amplification circuits that each drives a corresponding one of the one or more loudspeakers located in the three-dimensional space.

8. The sound generation system of claim 1, wherein to receive, using the user interface, the configuration directed at the graphical representation of at least one of the listener location or the one or more graphical representations of the one or more sound source locations, the processing device is further to:

dynamically moving, using the user interface, at least one of the graphical representation of the listener position or the one or more graphical representations of the one or more sound source locations to change at least one of the listener location or the one or more listeners or sound source locations;

responsive to dynamically moving at least one of the graphical representation of the listener position or the one or more graphical representations of the one or more sound source locations, generate updated one or more channels of sound signals; and provide the one or more channels of sound signals and the updated one or more channels of sound signals dynamically to the one or more loudspeakers to generate an updated three-dimensional sound field.

9. The sound generation system of claim 1, wherein the sound generation system is installed in the three-dimensional space of a virtual conference room, virtual concert system, a game system, an in-vehicle sound system, or a theater sound system, wherein each of the corresponding sound sources comprises a conference, concert, or game participant, and wherein the processor is to:

present the corresponding sound sources in the three-dimensional space representing a virtual conference room, a virtual concert, a game system, an in-vehicle sound system, or a theater sound system based on at least one of locations of the sound sources, a location of at least one of the one or more listeners or the one or more sound sources, the user configuration, or pre-programmed software.

10. The sound generation system of claim 1, further comprising at least one of:

a microphone array comprising a plurality of microphones for capturing sound from the one or more sound sources of different directions;

an acoustic echo cancellation unit for removing echoes in the one or more sound sources;

a noise reduction unit for reducing a noise component in the one or more sound sources;

a set of sound equalizer units for processing each one of the one or more sound sources;

a reference sound capture circuit positioned at proximity to the one or more loudspeakers for capturing a reference signal, wherein the acoustic echo cancellation unit is to remove the echoes based on the captured reference signal; or a speech recognition unit to recognize voice commands.

11. The sound generation system of claim 1, wherein the sound generation system is implemented on at least one of a smartphone, a smart speaker, a soundbar, a television set, a game console, a home/theater sound system, a computer, a tablet computer, an automobile vehicle, a headset, a helmet, or a cloud server.

12. The sound generation system of claim 1, wherein the processing device is to separate, using a computation model implemented in one or more local, remote, or cloud computing devices, the sound stream into the one or more sound sources, the method further comprising:

apply signal processing to the one or more sound sources to generate one or more sound sources with adjustable volume and frequency response.

13. A computer-implemented method for generating three-dimensional sound, comprising:

receiving a sound stream that is composed of the one or more sound sources, wherein each of the one or more sound sources corresponds to a respective sound type;

obtaining a specification/pre-configuration of a three-dimensional space comprising a listener position and one or more sound source locations;

presenting, in a user interface of a user interface device, graphical representations representing a listener at the listener location in the three-dimensional space and the one or more sound sources at the one or more sound source locations;

receiving, using the user interface, a configuration directed at a graphical representation of at least one of the listener location or one or more graphical representations of the one or more sound source locations;

responsive to receiving the configuration, generating, using the sound stream based on the listener location and the one or more sound source locations, one or more channels of sound signals for driving one or more loudspeakers; and providing the one or more channels of sound signals to the one or more loudspeakers to generate a three-dimensional sound field that renders a sound effect as if the listener at the listener position listens to the one or more sound sources at the one or more sound source locations in the three-dimensional space.

14. The method of claim 13, wherein the sound stream includes at least one of a mono or stereo sound stream, the sound generation system comprises a screen/display and a matrix of loudspeakers/sound generators, the matrix of loudspeakers/sound generators are aligned with the area of the screen/display, and wherein the matrix of loudspeakers/sound generators are arranged behind or attached to the screen/display or are an array of flat, transparent, and screen top loudspeakers/sound generators, the method further comprising:

obtaining a video stream that is associated with the audio stream;

determining, based on content of the video stream, the one or more sound source locations of the one or more sound sources on the screen/display that presents the content of the video stream;

determining, from the matrix of loudspeakers/sound generators, the one or more loudspeakers/sound generators that correspond to the one or more sound source locations of the one or more sound sources on the screen/display; and providing the one or more channels of sound signals to the one or more loudspeakers/sound generators to generate the three-dimensional sound field.

15. The method of claim 13, wherein the sound type comprises one or more of a voice sound, a vocal sound, an instrument sound, a car sound, a helicopter sound, an airplane sound, a vehicle sound, a gunshot sound, a footstep sound, an explosion sound, a sound in a movie, a sound in a game, or an environmental sound.

16. The method of claim 13, wherein the three-dimensional space further comprises one or more loudspeaker positions, wherein presenting, in a user interface of the user interface device, graphical representations representing a listener at the listener location in the three-dimensional space and the one or more sound sources at the one or more sound source locations further comprises:

presenting, in the user interface, icons representing the listener at the listener position, and the one or more sound sources at the one or more sound source locations in the three-dimensional space, wherein each of the icons is at least one of a symbol representation, an image of a corresponding source, a video of the corresponding sound source, or an animation.

17. The method of claim 13, wherein receiving, using the user interface, the configuration directed at the graphical representation of at least one of the listener location or the one or more graphical representations of the one or more sound source locations comprises dynamically moving, using the user interface, at least one of the graphical representation of the listener position or the one or more graphical representations of the one or more sound source locations to change at least one of the listener location or the one or more listeners or sound source locations, the method further comprising:

responsive to dynamically moving at least one of the graphical representation of the listener position or the one or more graphical representations of the one or more sound source locations, generating updated one or more channels of sound signals; and providing the one or more channels of sound signals and the updated one or more channels of sound signals dynamically to the one or more loudspeakers to generate an updated three-dimensional sound field.

18. A cloud sound generation system, comprising:
one or more processing devices to:
receive a sound stream that is composed of the one or more sound sources, wherein each of the one or more sound sources corresponds to a respective sound type;
receive a specification/pre-configuration of a three-dimensional space comprising a listener position and one or more sound source locations;
present, in a user interface of a user interface device, graphical representations representing a listener at the listener location in the three-dimensional space and the one or more sound sources at the one or more sound source locations;
receive, using the user interface, a configuration a configuration directed at a graphical representation of at least one of the listener location or one or more graphical representations of the one or more sound source locations;
responsive to receiving the configuration, generate, using the sound stream based on the listener location and the one or more sound source locations, one or more channels of sound signals for driving one or more loudspeakers; and
provide the one or more channels of sound signals to one or more sound generation devices to generate a three-dimensional sound field in a virtual or real three-dimensional space.

19. The cloud sound generation system of claim 18, wherein the sound stream includes at least one of a mono or stereo sound stream, wherein the one or more sound generation devices comprise a screen/display and a matrix of loudspeakers/sound generators, wherein the matrix of loudspeakers/sound generators are aligned with the area of the screen/display, wherein the matrix of loudspeakers/sound generators are arranged behind the screen or are an array of flat, transparent, and screen top loudspeakers/sound generators, and wherein the one or more processing devices are further to:

obtain a video stream that is associated with the audio stream;

determine, based on content of the video stream, the one or more sound source locations of the one or more sound sources on the screen/display that presents the content of the video stream;

determine, from the matrix of loudspeakers/sound generators, the one or more loudspeakers/sound generators that correspond to the one or more sound source locations of the one or more sound sources on the screen/display; and provide the one or more channels of sound signals to the one or more loudspeakers/sound generators to generate the three-dimensional sound field.

20. The cloud sound generation system of claim 18, wherein the three-dimensional sound field in a real or virtual three-dimensional space including at least one of a virtual conference room, a virtual or real concert system, a game system, an in-vehicle sound system, or a theater sound system.

* * * * *